(12) United States Patent
Ainsworth et al.

(10) Patent No.: US 6,821,346 B2
(45) Date of Patent: Nov. 23, 2004

(54) POWDER COATING SYSTEMS

(75) Inventors: James Ainsworth, Runcorn (GB);
Louis Van Den Bergh, Kapellen (BE);
Luigi Perillo, Pescate (IT)

(73) Assignee: Nordson Corporation, Westlake, OH (US)

( * ) Notice: Subject to any disclaimer, the term of this patent is extended or adjusted under 35 U.S.C. 154(b) by 38 days.

(21) Appl. No.: 10/372,586

(22) Filed: Feb. 21, 2003

(65) Prior Publication Data

US 2003/0127047 A1 Jul. 10, 2003

Related U.S. Application Data

(63) Continuation of application No. 10/214,277, filed on Aug. 7, 2002, now abandoned, which is a continuation-in-part of application No. 10/168,329, filed as application No. PCT/GB01/01116 on Mar. 14, 2001.

(51) Int. Cl.[7] .............................................. B05B 15/12
(52) U.S. Cl. ............................ 118/326; 454/50; 15/301
(58) Field of Search ........................... 118/326; 15/301; 454/50, 53

(56) References Cited

U.S. PATENT DOCUMENTS

| | | | |
|---|---|---|---|
| 3,714,926 A | 2/1973 | Ofner | |
| 3,719,030 A | 3/1973 | Blankenmeyer et al. | |
| 3,777,706 A | * 12/1973 | Kaufman | 118/603 |
| 3,814,002 A | 6/1974 | Rombach et al. | |
| 3,905,785 A | * 9/1975 | Fabre | 95/280 |
| 3,918,640 A | 11/1975 | Piccino et al. | |
| 3,918,641 A | 11/1975 | Lehmann et al. | |
| 4,153,008 A | 5/1979 | Marino et al. | |
| 4,378,728 A | 4/1983 | Berkmann | |
| 4,409,009 A | 10/1983 | Lissy | |
| 4,430,956 A | 2/1984 | Koch, II | |
| 4,471,715 A | * 9/1984 | Gubler et al. | 118/324 |
| 4,504,292 A | 3/1985 | Vöhringer | |
| 4,537,120 A | 8/1985 | Josefsson | |
| 4,704,953 A | 11/1987 | Wilson | |
| 4,715,314 A | * 12/1987 | Ramseier et al. | 118/631 |
| 4,770,089 A | 9/1988 | Vinicombe | |
| 4,787,330 A | * 11/1988 | Bolf | 118/308 |
| 4,926,746 A | 5/1990 | Smith | |
| 5,042,420 A | 8/1991 | Gerdes | |
| 5,107,756 A | 4/1992 | Diaz | |
| 5,153,028 A | 10/1992 | Shutic et al. | |
| 5,256,201 A | 10/1993 | Gelain et al. | |
| 5,275,634 A | 1/1994 | Kramer | |
| 5,346,553 A | 9/1994 | Pingel | |
| 5,421,885 A | 6/1995 | Trevisan | |
| 5,615,980 A | 4/1997 | Mauchle | |
| 5,680,670 A | * 10/1997 | Adams et al. | 15/302 |
| 5,681,390 A | 10/1997 | Lacchia | |
| 5,766,355 A | 6/1998 | Josefsson et al. | |
| 5,928,423 A | 7/1999 | Toyota et al. | |
| 6,010,571 A | * 1/2000 | Josefsson et al. | 118/326 |

6,461,431 B1  10/2002  Ainsworth et al.

FOREIGN PATENT DOCUMENTS

| | | |
|---|---|---|
| CH | 529590 | 10/1972 |
| DE | 30 28 588 A1 | 2/1982 |
| DE | 34 08 014 A1 | 9/1985 |
| DE | 37 15 470 A | 11/1988 |
| DE | 8907538 U1 | 10/1990 |
| DE | 295 18 478 U1 | 1/1996 |
| DE | 195 17 729 A1 | 2/1996 |
| DE | 195 00 873 A1 | 7/1996 |
| DE | 196 44 360 A1 | 4/1998 |
| EP | 0 223 660 A1 | 5/1987 |
| EP | 0165 815 B1 | 5/1989 |
| EP | 0 698 421 A1 | 8/1994 |
| EP | 0 678 336 A2 | 3/1995 |
| EP | 0 689 875 A2 | 6/1995 |
| EP | 0 701 868 A1 | 3/1996 |
| EP | 0 839 582 B1 | 5/1998 |
| EP | 0 839 583 B1 | 5/1998 |
| FR | 2 675 061 A1 | 4/1991 |
| FR | 2 724 583 A1 | 9/1994 |
| GB | 429 028 A | 5/1935 |
| GB | 2 120 303 A | 3/1983 |
| GB | 2 141 642 A | 1/1985 |
| WO | WO 95/10365 A1 | 4/1995 |
| WO | WO 99/12658 A1 | 3/1999 |

OTHER PUBLICATIONS

International Search Report for PCT/US 00/25383.

* cited by examiner

Primary Examiner—Richard Crispino
Assistant Examiner—Michelle Acevedo Lazor
(74) Attorney, Agent, or Firm—Calfee, Halter & Griswold LLP

(57) ABSTRACT

A powder spray booth (2) with a powder recovery system having an overspray intake (18) communicating with the interior of the booth. A vertically extending duct (20) leads from the overspray intake to a powder recovery system such as, for example, a cyclone. The vertically extending duct may have doors (32) opening to the interior of the booth to provide access to the vertical duct for cleaning. The doors may have holes (120) to aspirate air from the booth interior to optimize air flow patterns within the booth. A diverter plate (26) within the booth (2) defines with the booth floor (10) a floor duct leading to the overspray intake (18). The diverter plate has apertures for allowing oversprayed powder to be collected through the plate. The diverter plate may be provided as two or more diverter plates held at different elevation levels within the booth to define a floor duct which is larger in parts of the floor duct which are closer to the overspray intake than parts of the floor duct which are farther from the overspray intake. The coating system may include an air assist which provides jets of air across a portion of the interior surface of the booth. The surface may be one or more sloped portions (22) of the floor and/or one or more portions of the diverter plate. The air supply may be pulsed to produce periodic bursts of air across the interior surface.

25 Claims, 14 Drawing Sheets

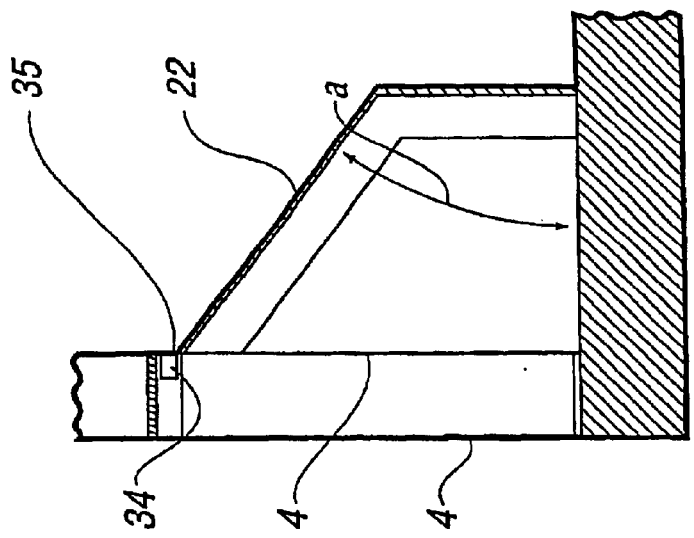
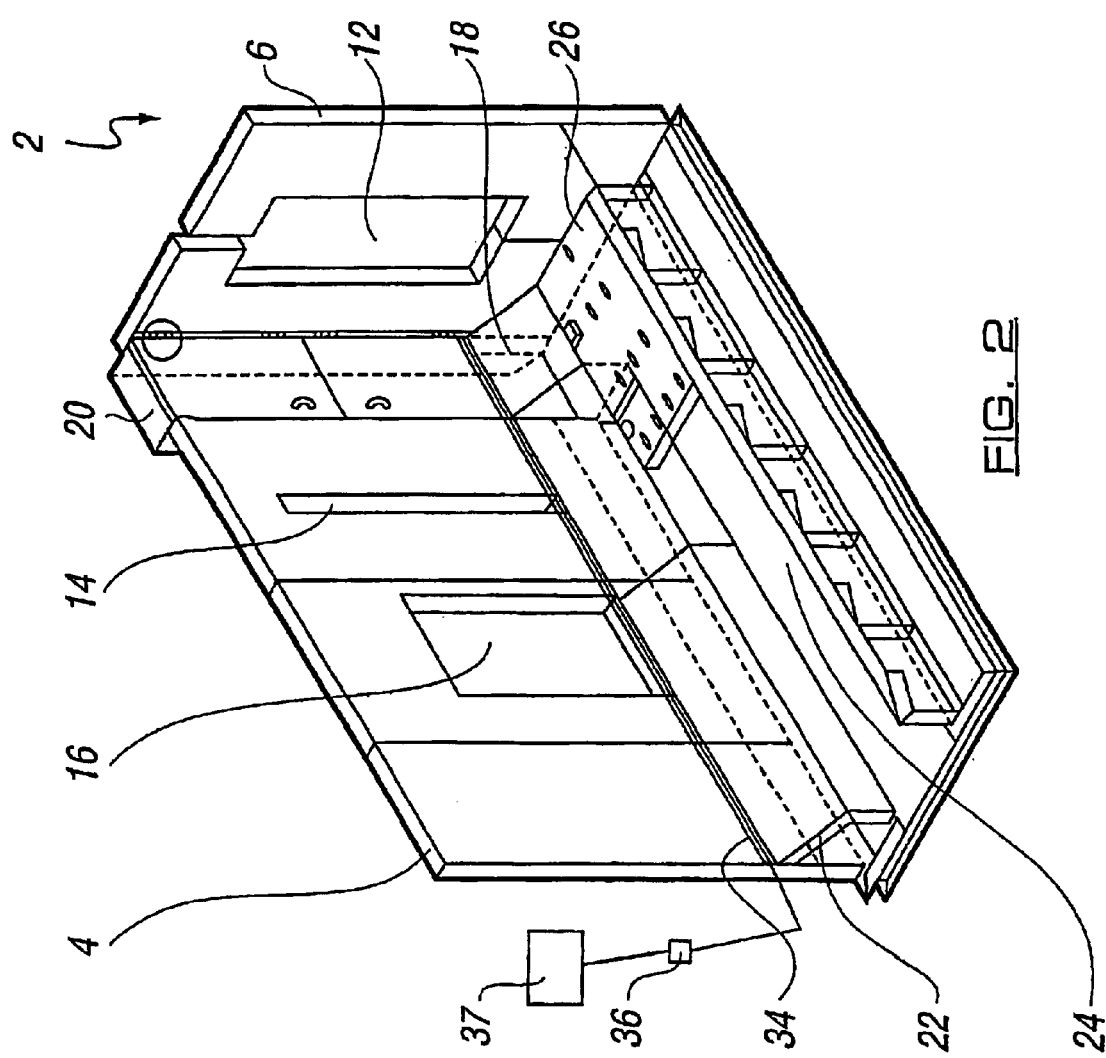

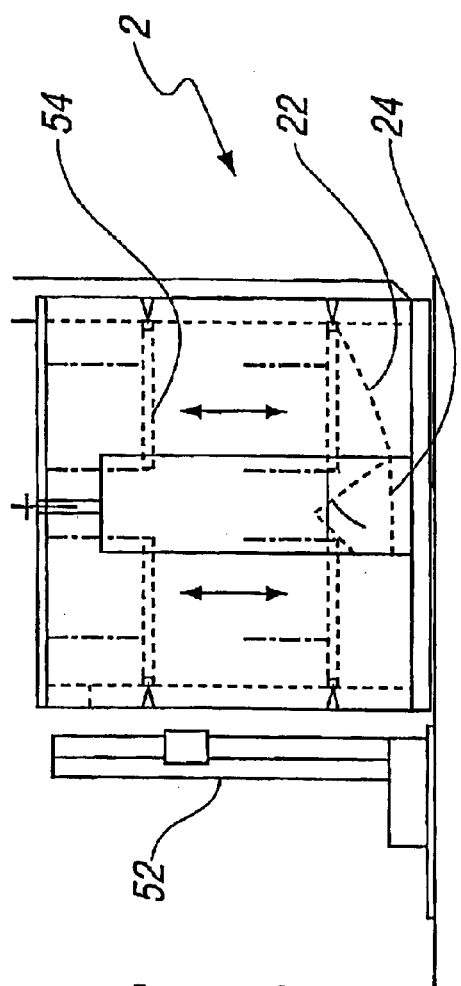
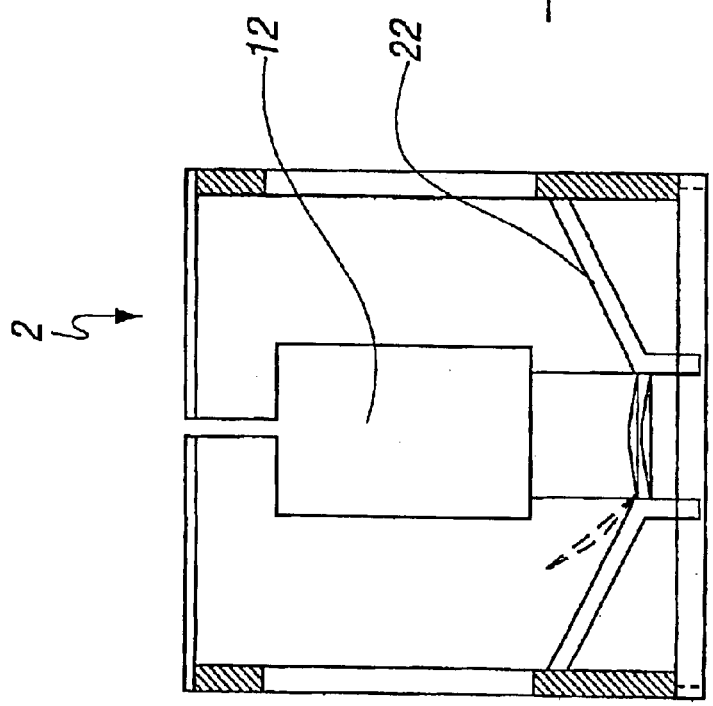

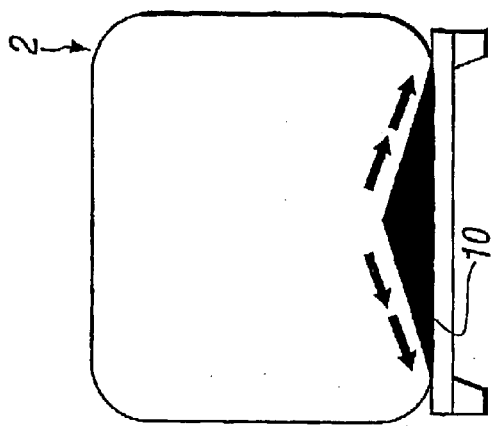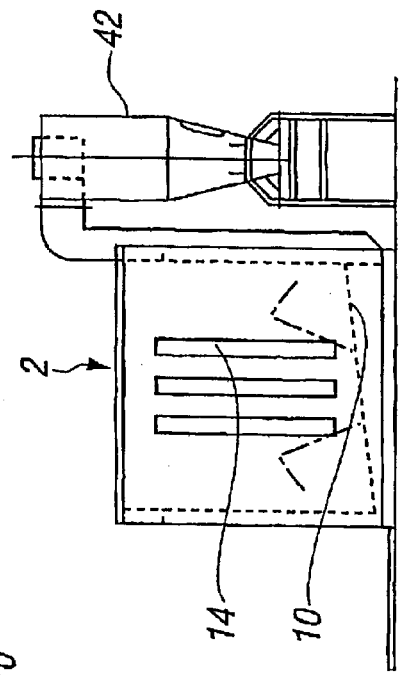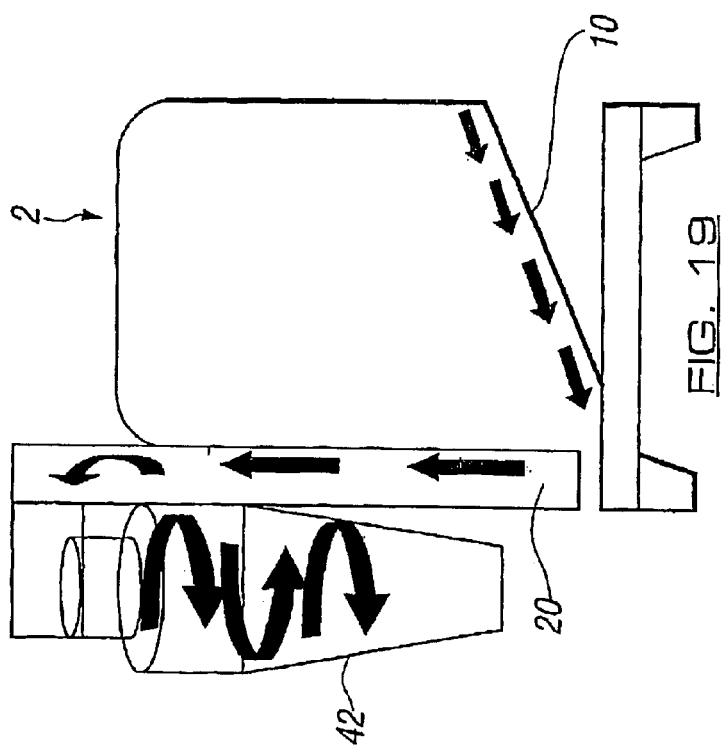

POWDER COATING SYSTEMS

RELATED APPLICATIONS

This application is a continuation of U.S. patent application Ser. No. 10/214,277, filed on Aug. 7, 2002, now abandoned for IMPROVEMENTS IN AND RELATING TO POWDER COATING SYSTEMS which is a continuation-in-part of U.S. patent application Ser. No. 10/168,329 filed Nov. 25, 2002, for IMPROVEMENTS IN AND RELATING TO POWDER COATING SYSTEMS, which is a §371 national patent application from PCT International patent application no. PCT/GB01/01116 filed on Mar. 14, 2001, for IMPROVEMENTS IN AND RELATING TO POWDER COATING SYSTEMS and claims the benefit of European patent application no. 00302737.2 filed on Mar. 31, 2000, the entire disclosures all of which are filly incorporated herein by reference.

This invention relates to powder spray coating and, in particular, to the recovery of powder which has not adhered to the article to be coated from a powder spray booth.

The powder which does not adhere to an article to be coated in a powder spray booth is known as the "overspray". Overspray powder may miss the article to be coated, rebound from a surface of the article, or be deflected by the electrostatic fields in the spray booth away from the article.

It is known to recover overspray powder by exhausting the air from the booth and hence the air-borne overspray powder. The filter elements which have been used to recover overspray from powder spray booth are capable of removing substantially all the overspray from the spray booth exhaust air so that the powder may be reused. It is also known to use cyclone separators instead of, or in conjunction with filter elements for recovery of overspray. Cyclone separators are effective in removing the majority of the overspray from the spray booth exhaust air and are easier to clean than filters because very little powder is deposited inside the cyclone housing.

In known arrangements the cyclone separators have been connected to the powder spray booth by a duct extending from an overspray intake near the floor of the booth to the inlet of the or each cyclone. European Patent Application No. 94929600.8 discloses a powder coating system where the duct is built into the powder spray booth, with one of the side or end walls of the booth forming part of the duct.

In European Patent Application 98940476.9 there is disclosed a further development wherein the portion of the side or end wall which forms part of the duct is removable from the remainder of the wall to allow easy cleaning of the duct. That Application also discloses a system for collecting deposited overspray powder comprising a scraper bar which continuously reciprocates across the booth floor between the end walls to collect powder on the booth floor and move the collected powder towards the end walls of the spray booth adjacent to each of which overspray intakes are provided.

In recent years there has been a growing desire to be able to spray multiple colours in a single booth in rapid succession. However, changing powder colour requires cleaning of the booth to remove powder deposited on the walls, ceiling and floor which was not extracted by air exhaustion. Proper cleaning of the walls and floor of the powder spray booth between colour changes is very important to ensure acceptable production quality. Such cleaning may be carried out manually by an operator using a scraping and/or compressed air jet apparatus. However booths have been proposed which are intended to automate the deposited overspray powder cleaning process including the booth of European Patent Application No. 98940476.9 referred to above with its reciprocating scraper bar.

Whilst many developments have been made, there is a customer driven demand for even more rapid cleaning capability to reduce cleaning time still further. Furthermore, whilst automatic mechanical devices such as the reciprocating scraper bar of European Patent Application 98940476.9 do accelerate the cleaning process, they also increase construction cost and can be vulnerable to mechanical failure.

Cleaning is preferably conducted from one end of the booth to another and so, from the point of view of cleaning, the overspray intake of the powder recovery system would ideally be located at one end of the booth. However, from the point of view of spraying, the best location for the overspray intake is commonly held to be in the lengthwise centre of the booth to give balanced extraction air flow along the booth and therefore even air flow across the openings which are provided for the spray devices. When the overspray intake is provided at one end of the booth, attempts have therefore been made to modify the booth cross-section to produce the desirable air flow balance. In one known system the booth floor has side portions which slope downwards and the region therebetween is vertically offset to define a trough between the sloped side portions. A triangular insert is positioned in the trough during spraying. The combination of the sloped side portions and triangular insert helps balance the air flows along the length of the booth. However difficulties arise when the powder colour is to be changed as the triangular insert has to be removed for cleaning which adds to the cleaning time.

In another arrangement, shown, for example, in U.S. Pat. No. 4,715,314, the booth floor is formed with a slot which extends the length thereof and connects to a duct also running the length of the booth. However the slot can accumulate powder when one colour is sprayed for a long period of time which makes cleaning more difficult.

It is also been proposed to reduce cleaning time by preventing powder from ever depositing on the floor of a spray booth. German Patent 3408014 describes a system where the floor of the booth is formed as a series of descending steps and air is blown across each step from the slot between it and the step thereabove. The aim is to provide an air stream across the width of the booth which will carry all powder falling towards the floor into the overspray intake and prevent the powder reaching the floor and depositing there. The step form of the booth floor however increases the overall complexity of the booth and this, and the fact that air has to be continuously supplied, makes the booth expensive.

German Patent Application No. 19644360 describes a booth which is also intended to prevent overspray powder reaching the floor. The booth has one or more nozzles for creating a generally horizontal airflow across the booth floor. The air flow diverts descending overspray powder towards the inlet of a powder recovery system and prevents the overspray powder from depositing on the floor. In one embodiment, a central baffle positioned above the floor creates an open-sided duct leading to the inlet and a nozzle directs air to each side. As with the system of German Patent 3468014 a continuous air supply is required.

As noted above, booths in which part of the floor is sloped are known. However, according to U.S. Pat. No. 3,905,785, sloping alone is insufficient to cause all the overspray powder to flow by gravity to the recovery system. The Patent proposes a booth in which the floor is constituted by at least one air-permeable inclined plate. Air is sucked from the booth through the plate which acts to filter out air borne overspray. Periodically air is blown up through the plate to fluidise the deposited overspray thereon and cause it to flow to a recovery system. The suction period may be five to twenty times longer than the blowing period. The concept is similar to that of cartridge filters which are periodically purged by reverse air jets.

The majority of known booths are rectangular. However, it is also known to provide circular booths. A circular booth is disclosed in, for example, EPA 0839522. A problem with known circular booths is that these have conical floors leading to a suction duct by which overspray powder is transferred to a recovery system. A pit is generally required to accommodate the cone and duct in order that articles to be sprayed can be received at the same level as other elements in the production line.

It is an object of the present invention to provide a colour spray apparatus in which powder colour can be changed quickly and easily and which, moreover, is of relatively simple construction.

It is another object of the present invention to provide a powder coating system in which both air borne and deposited overspray can be recovered by a system involving a small number of relatively simple parts which are themselves readily cleaned.

It is a further object of the present invention to provide a powder spray booth in which the collection of deposited overspray is facilitated whilst still balancing the extraction air flow along the length of the booth.

It is a still further object of this invention to provide a powder spray booth of generally circular configuration which can be easily incorporated in a production line and which is simple to clean.

The invention will now be summarised with respect to four principal aspects: a diverter plate; sloped floor with cleaning air; pulsed cleaning air apparatus, and pulsed cleaning air method.

In one aspect the present invention provides a powder coating system comprising a powder spray booth with walls and a floor having two side portions and a downwardly offset region therebetween which defines a trough between the side portions, one or more powder spray devices positioned with respect to the booth walls to spray articles passed through the booth via openings in the walls, a powder recovery system having an overspray intake communicating with the interior of the booth, the powder recovery system including suction means for drawing overspray powder from the booth interior via the overspray intake, and, a diverter plate held within the booth between the floor side portions such as to close at least part of the trough and form a floor duct which is in communication with the overspray intake, the diverter plate including at least one aperture for the passage of overspray powder deposited thereon to the duct.

It has been found that with this apparatus it is possible to even out air extraction to give balanced air flow in the booth whilst still providing an arrangement which is easy to clean particularly if, as is preferred, the diverter plate is movable to a second raised position allowing access to the trough. The provision of at least one aperture allows overspray powder deposited on the diverter plate to be drawn therethrough and into the powder recovery system.

Preferably the side portions are sloped down towards the diverter plate. The diverter plate may define a slot between it and each of the side portions.

Deposited overspray powder on the side portions will trickle down towards the diverter plate and be extracted by the air flow to the powder recovery system via the slots between the plate and the side portions. As already noted, deposited overspray powder on the surface of the plate will be extracted via the apertures therein. As a consequence the amount of deposited overspray powder in the booth at the start of the cleaning operation will be reduced so reducing the scale of the cleaning operation and consequently its duration.

The booth may have any desired configuration. It may have the common rectangular shape with the longitudinal axis running generally horizontally. Alternatively, the booth can be circular with the central axis running generally vertically. The provision of an air distribution duct in a circular booth formed by the diverter plate enables limitation of powder build up and optimisation of air distribution and velocities in the booth through control of the size and shape of the apertures in the diverter plate. Advantage can therefore be taken of the easy cleanability of circular booths without requiring that a special pit be provided to position the booth in a production line. This is a significant benefit as is the fact that operators can safely walk into the booth which is not possible with known circular booths having a conical base.

In a rectangular booth, the overspray intake may be provided at or near one end of the booth with the diverter plate extending from that end along part of the length of the booth. In a rectangular booth provided with a plurality of automatic powder spray devices and having slots in the side walls for the automatic powder spray devices, the length of the diverter plate may be the distance between the end and the gun slot furthest from the end plus an offset. The offset can be comparatively small, a suitable value for a common booth design being 200 mm.

It has been found that it is only necessary to provide the diverter plate in the part of the booth where automatic guns are employed. This is because there are a higher number of guns in the automatic gun portion of the booth and therefore more powder flow into the booth there from the guns. Also, this part of the booth is closest to the extraction fan. Without the diverter plate, the fan can distort the powder spray patterns from the guns and may draw the powder into the collection system before it has a chance to adhere to the part. The effect of the diverter plate is to equalize the suction force of the fan so that powder has more time to adhere to the part and oversprayed powder is drawn evenly towards the fan. In the manual gun section of the booth, there are fewer guns and they are farther away from the fan, so the patterns from those guns are not affected to such a great extent by the fan. Therefore, the diverter plate is not as necessary in the manual gun section of the booth.

In a rectangular booth of the design shown in European Patent Application No. 98940476.9 with an overspray intake at each end, a diverter plate may be provided extending from each end. It has been found that a booth with air intakes at both ends in fact produces the best balancing of the air flow in the booth and actually results in a "dead" zone in the middle of the booth where powder coating is particularly efficient since powder particles have an opportunity to adhere to the part relatively unaffected by the collection system air flows. The plates can be arranged to extend to either side of this "dead" zone.

In a particularly preferred embodiment, the diverter plate is formed in two or more sections, the diverter plate sections being arranged at different vertical spacings from the bottom of the trough such that the duct has different heights along its length. It has be found with this arrangement it is possible to improve still further the air flow balance in the booth and to obtain more even suction.

In this embodiment, the plate section or sections adjacent the or each overspray intake may have the greatest vertical spacing from the trough bottom. With a rectangular booth having an overspray intake at one end, the sections may be arranged in a descending series of steps towards the other end. With a circular booth having a centrally located overspray intake, the section thereabove may be at maximum spacing with one or more lower sections on either side. The narrowing of the duct away from the overspray intake produces the desired even suction and more balanced air flow.

The diverter plate is suitably provided with a plurality of apertures arranged in a pattern. With a rectangular booth, the pattern may be triangular with the apex being at the end of the booth closest to the fan. This pattern has been found to give the best combination of powder collection and air balancing. The total hole cross-sectional area gradually increases from the end towards the middle of the booth.

The apertures in a preferred form are elongate in the lengthwise direction of the plate to give maximum circumference for given cross sectional area and therefore maximum ability to draw deposited overspray from the upper surface of the diverter plate.

In accordance with a second aspect, the present invention provides a powder coating system comprising a powder spray booth having floor and walls, one or more powder spray devices positioned with respect to the walls to spray articles passed through the booth via openings in the walls, and a powder recovery system having an overspray intake communicating with the interior of the booth, the powder recovery system including suction means for drawing overspray powder from the booth interior via the overspray intake, wherein at least a portion of the booth floor is sloped and wherein cleaning air supply means is provided for directing air down the sloped portion(s).

Whilst it has been known to make at least a portion of booth floors sloping, the intended result of this, that deposited overspray powder will eventually trickle down the sloped portion, does not always occur. There can be significant build ups of deposited overspray powder on the sloped portion or portions which adds to cleaning time and also gives rise to danger of explosions. By providing a cleaning air supply which directs air down the sloped portion or portions, downward movement of deposited overspray powder is ensured to bring the deposited overspray powder to a region where it can be easily cleaned, either manually or automatically by a mechanical scraper or the like and/or extraction in the exhaust air of the powder recovery system.

The cleaning air supply means may comprise a source of air and at least one plenum extending along at least part of the sloped portion and located at the upper edge of the sloped portion, the plenum having at least one air outlet, preferably plural air outlets.

Very preferably the air source provides periodically pulses of air to the air outlets. It has been found that it is an unnecessary waste of energy to constantly direct air across the slope portion or portions and it suffices just to pulse the air to start movement of deposited overspray powder down the sloped portion or portions. It is currently believed that the best effects are achieved when the cleaning air supply means directs the air generally parallel to the surface of the sloped portion or portions, preferably at an angle of 1–3° to the sloped portion or portions.

In the particularly preferred configuration of the first aspect, the cleaning air supply means of the second aspect may direct air down the side portions along the length of the diverter panel.

In accordance with a third aspect, the present invention provides a powder spray system having a floor, and walls, one or more powder spray devices positioned with respect to the walls to spray articles passed through the booth via openings in the walls, and a powder recovery system having an overspray intake communicating with the interior of the booth, the powder recovery system including suction means for drawing overspray powder from the booth interior via the overspray intake, wherein a cleaning air supply means is provided comprising a source of air and at least one plenum with plural air outlets, the air source providing pulses of air to the air outlets and the plenum being arranged to direct the air pulses across an internal surface of the booth on which overspray powder is deposited.

It has been found that pulses of air may be effective for collection of deposited powder across any internal surface of the booth not just sloped surfaces. The pulses of air cause the deposited overspray powder to collect, either by falling in the case of the ceiling or walls, or by movement along or across the booth in the case of the floor and so facilitate extraction of the deposited overspray powder by the powder recovery system. Good results are achieved without the need for a constant air flow or a complicated structure for directing the air. Thus the system is very economical both as regards manufacture and operation.

The air source may be a compressed air source, one or more fans or an air supply of the powder recovery system. The former has the advantage of cheapness whilst the latter makes for compactness and quietness since fans are relatively noisy.

Very preferably the first aspect is combined with the second and/or third which results overall in a very significant reduction in cleaning time coupled with even air distribution across the booth which produces higher transfer efficiency since the powder particles are given a greater opportunity to adhere to the part. These advantages are accomplished while good powder containment within the booth is also being achieved.

The invention also provides in a fourth aspect a method of operating a powder coating system including a powder spray booth having a floor and walls, one or more powder spray devices and a powder recovery system with an overspray inlet communicating with the interior of the booth, the method comprising periodically directing jets of air across an internal surface of the booth to collect deposited overspray powder thereon.

The method thus involves providing air assist in the booth which facilitates collection and removal of deposited overspray powder.

The internal surface may be the floor and/or one or more walls and/or the ceiling of the booth.

The jets of air are preferably directed sideways across the surface, or lengthwise along the booth. In this way the powder is gathered together and easily collected by a cleaning operation along the booth which may be either manual or automatic.

It has been found that good results are achieved when the air jets are pulsed on for five seconds for every five minutes of spraying of articles in the booth. This prevents any significant build-up of deposited overspray powder by causing removal of the majority of deposited overspray from the booth with the result that the inventory of powder moving around in the system, particularly the quantity within the booth itself, is kept to a minimum.

Alternatively or additionally the jets of air can be pulsed just prior to a colour change so that the amount of deposited powder which has to be removed during the cleaning operation is minimised.

Very preferably this fourth aspect is combined with the second aspect and the air jets are directed across at least part of a sloping portion of the booth floor. For effective movement of deposited overspray powder on the sloping portion (s), the air jets are directed generally parallel the sloping portion(s), preferably at an angle of between 1–3° thereto.

Still a further aspect of the invention relates to the use of pressurized air to blow off overspray powder from the surface of the diverter plate. In one embodiment, the diverter plate has sloping surfaces, and an air plenum is provided along the apex to direct pressurized across the sloping surfaces. Overspray powder is thus blown off the diverter plate and into the floor duct below. The pressurized air may be a continuous flow or pulsed. The use of pressurized air to blow off the diverter plate may be used alone or in combination with the blow off feature of the sloped floor.

Still another aspect of the invention relates to the use of a vertically extending duct having a lower end in communication with the overspray intake and the floor duct. In one embodiment, the vertically extending duct has a removable portion such as doors that form part of the spray booth wall structure. The vertical duct removable portion is provided with one or more holes, slots or other openings to aspirate air from the spray booth during a spraying operation. Preferably the openings are located at an upper region of the vertical duct. Sliding wall sections of the spray booth may also be provided as required.

The invention also contemplates methods for cleaning a spray booth and methods for recovering overspray powder during a powder spraying operation using one or more of the above aspects of the present invention, as set forth in greater detail hereinafter.

The invention will now be further described by way of example with reference to the accompanying drawings in which:

FIG. 2 is a perspective view partly cut away of part of a powder spray booth forming part of a second embodiment of a powder coating system in accordance with the invention;

FIG. 3 is a sectional detail of part of the booth of FIG. 2;

FIG. 13 is a section along Y—Y of the powder coating system of FIG. 11;

FIG. 14 is a schematic end view showing a cleaning system for use in the powder coating systems of FIGS. 9 to 13;

FIG. 19 is a schematic view of a powder spray booth forming part of a further embodiment of a powder coating system in accordance with the invention, and, FIGS. 20 and 21 are schematic views of alternative powder spray booths.

It is important to note that this application describes a number of different aspects, features and embodiments of the invention. Although these various aspects and embodiments may illustrate various combinations and uses of these aspects, the invention should not be construed as requiring such combination and uses. Those skilled in the art will readily appreciate that the various aspects of the invention as set forth herein may be used alone or in various combinations and sub-combinations whether explicitly described herein or not.

Figure 1:
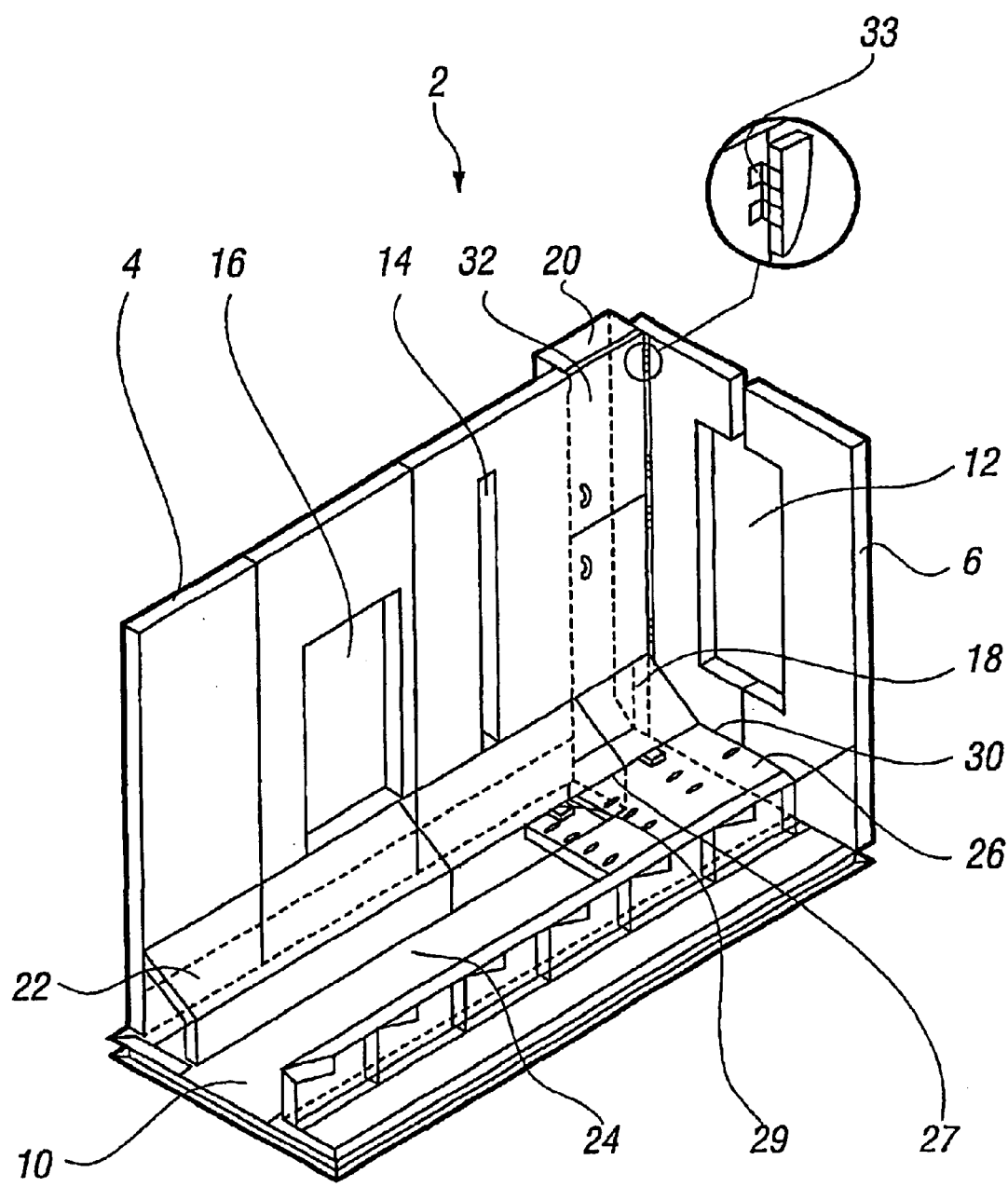
FIG. 1 is a perspective view partly cut away of a powder booth forming part of a first embodiment of a powder coating system in accordance with the invention.

FIGS. 1 and 2 show a rectangular powder spray booth 2 with side walls 4, end walls 6 and a floor 10. The booth 2 further has a conveyor (not shown) from which objects are suspended and conveyed through the booth 2 via openings 12 in the end walls 6 for coating with powder by a number of spray devices (also not shown). The booth 2 shown in FIGS. 1 and 2 has a slot 14 for an automatic spray device and an opening 16 to allow use of a manually operated spray device in each side wall. However it will be appreciated that the number and position of spray devices can be varied depending on the objects to be coated.

The ceiling, walls 4, 6 and floor 10 of the booth 2 are preferably made from a non-conducting material such as plastic. By using plastic, the powder sprayed by the spray devices if electrostatically charged will have a reduced tendency to adhere to the ceiling and walls 4, 6 since it will not be electrostatically attracted to the walls 4, 6 and ceiling and instead will fall under gravity and collect on the floor 10 of the booth 2. For durability the floor 10 or at least the part or parts on which an operator will walk may instead be made of stainless steel.

The booth 2 will be provided with a powder recovery system which may include filters and/or one or more cyclone separators as further described below with respect to other embodiments of the powder coating system. Whatever form the powder recovery system takes, there will be an overspray intake communicating with the interior of the booth 2 and providing a current of exhaust air within the booth and into the overspray intake. The current of exhaust air will serve to extract airborne overspray powder. The skilled man can readily choose a suitable powder recovery system from those known in the art.

As rectangular powder spray booths are preferably cleaned from one end to the other, for the purposes of cleaning the overspray intake is preferably located at one end of the booth. In the booth depicted in FIGS. 1 and 2, the overspray intake is shown in dotted outline at 18 and is located at one corner of the booth. Rising thereabove is a duct 20 which leads to the powder recovery system which is preferably a powder recovery system of the type styled "close coupled cyclone" as described in European Patent Application No. 94929600.8, now European Patent No. 723,481.

The floor 10 of the booth 2 shown in FIGS. 1 and 2 includes two sloping portions 22 on either side thereof, the sloping portions 22 being spaced and the remainder of the floor 10 being offset therefrom to define a trough 24 between the sloping portions 22. The wall of the trough 24 is cut away at the end of the booth 2 where the overspray intake 18 is located to provide a connection between the overspray intake 18 and the trough 24 and hence the rest of the interior of the booth 2.

A diverter plate 26 is positioned in the trough 24 at the end where the overspray intake 18 is located and extends from that end. The length of the diverter plate 26 is preferably equal to the distance from the end of the booth 2 to the centre line of the automatic spray device slot 14 which is furthest from that end plus an offset. The offset may suitably be of the order of 200 mm. The plate 26 is suitably spaced from the side portions 22 to define slots 27 therebetween.

Figure 4:
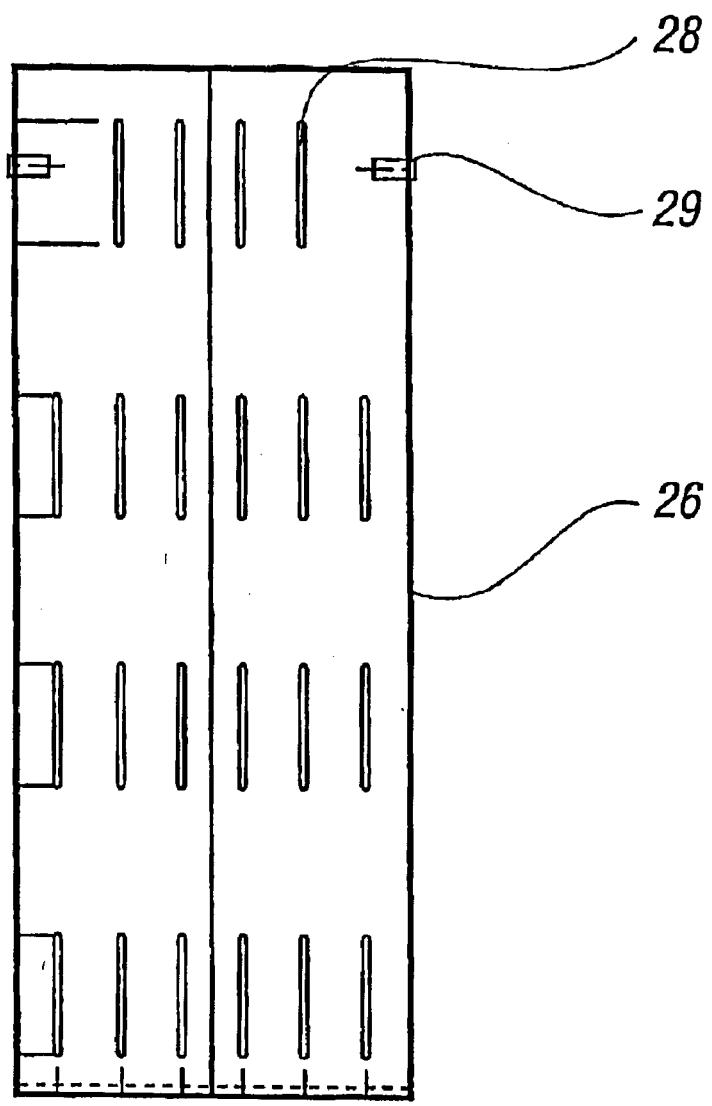
FIGS. 4 and 5 are plan views of a diverter plate for use in the spray booth of FIGS. 1 and 2.
Figure 6:
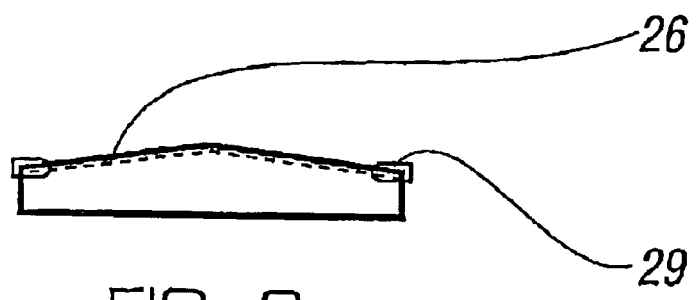
FIG. 6 is an end view of the diverter plate of FIGS. 4 and 5.
Figure 5:
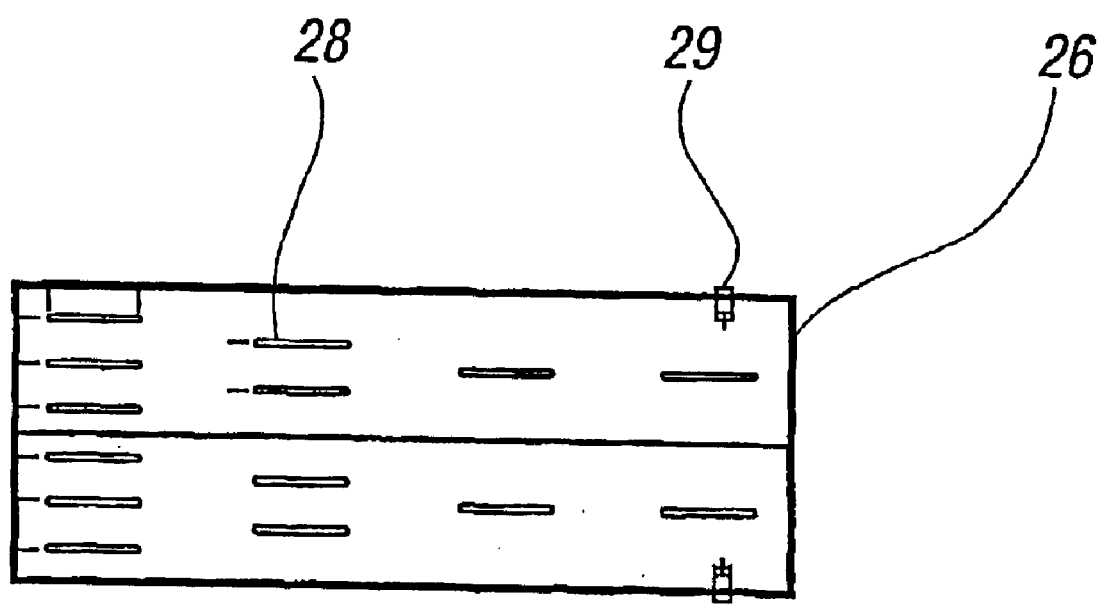

The plate 26 has a pattern of holes 28 therein. Two possible patterns are shown in FIGS. 4 and 5. Both are triangular with the apex being at the end of the booth 2 where the overspray intake 18 is located. The holes 28 are elongate in the lengthwise direction of the plate 26 and hence the booth 2. As illustrated in FIG. 6 the plate 26 has an upper surface which is slightly peaked for strength and stiffness.

The diverter plate 26 is supported by tabs 29 in the position shown in FIGS. 1 and 2 but is mounted to the end wall 6 via hinges 30 to allow it to be pivoted up and against the end wall 6. The portion of duct 20 extending above the side floor portions 22 is separated from the interior of the booth 2 by two doors 32 each of which is also mounted by hinges 33 so that the doors 32 can also be pivoted away against the end wall 6 allowing access to the interior of the duct 20.

With the diverter plate 26 installed over the trough 24, a floor duct is formed by the diverter plate 26 and the trough structure whereby overspray powder is drawn into the floor duct through the holes 28 and the slots 27. The overspray powder is drawn by the powder recovery system air flow suction into and through the floor duct and into the vertical duct 20 through the overspray intake 18.

Figure 6A:
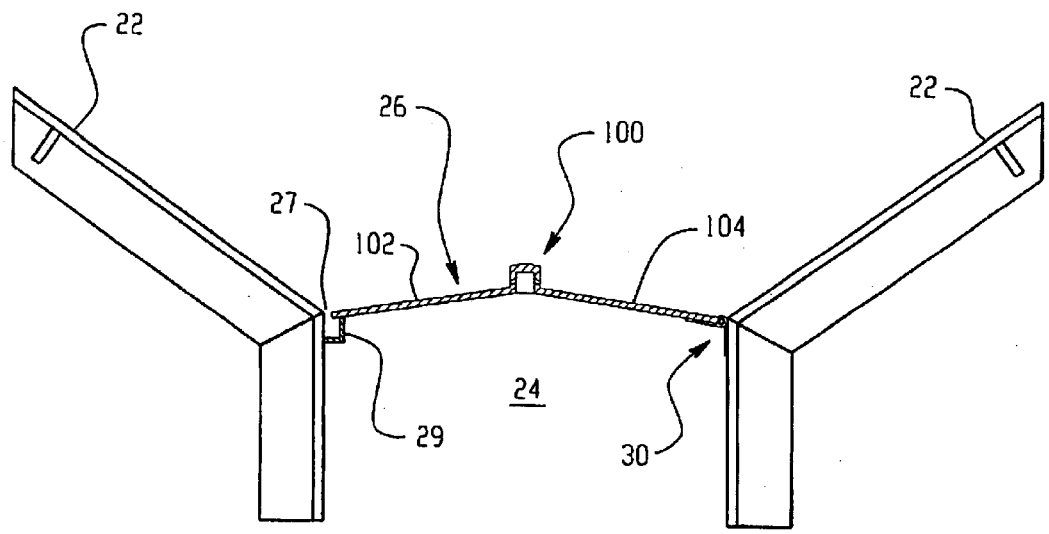
FIGS. 6A and 6B are respectively an end view and transverse cross-section view of another embodiment of the diverter plate of FIG. 6.
Figure 6B:
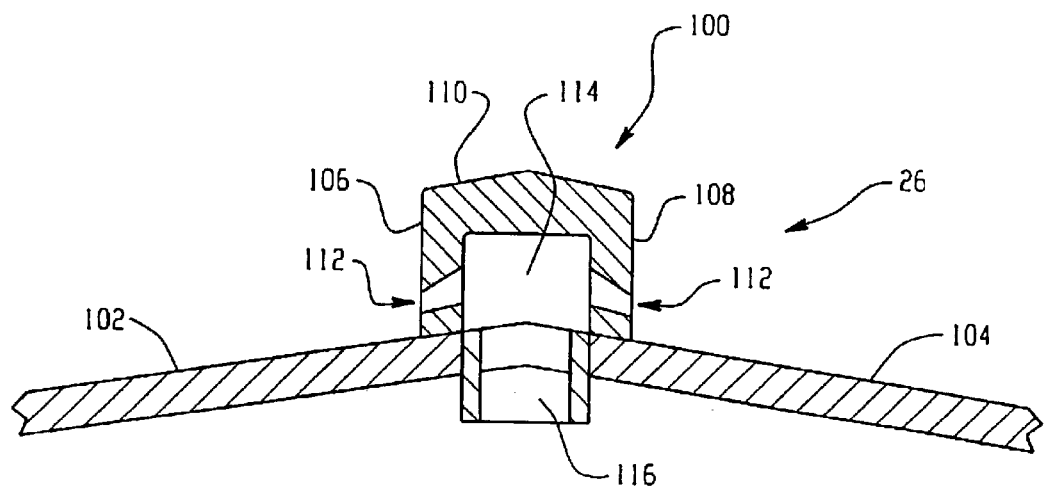

With reference to FIGS. 6A and 6B, in an alternative embodiment, the peaked diverter plate 26 includes a longitudinally extending diverter plate blow-off air plenum 100. The diverter plate plenum 100 is preferably positioned along the apex or peak of the sloped sides 102, 104 of the diverter plate 26 and extends along all or a portion of the length of the diverter plate 26. It should be noted that the diverter plate plenum 100 may also be used with a flat, round or other shaped diverter plate such as is shown, for example, in FIGS. 1 and 2 herein.

The diverter plate plenum 100 is an integral cap-like structure having two vertical sides 106, 108 and a top 110. The plenum 100 may be mounted on the diverter plate 26 by any suitable technique. Each vertical side 106, 108 is provided with a lengthwise series of openings 112, in this example a series of air jets. Each air jet 112 extends through its respective plenum side 106, 108 and opens to an interior air passage 114 of the plenum 100. Each air jet 112 is also angled so as to direct a flow of air generally across the outer surface of the diverter plate 26 to blow powder off the plate. The dislodged powder is blown into the floor duct via either or both of the diverter plate holes 28 or the side slots 27 between the plate 26 and the sloped floor portions 22.

Pressurized air is supplied to the internal air passage 114 and directed out the air jets 112. The pressurized air is supplied to the plenum 100 via one or more inlet ports 116. These inlet ports 116 communicate with a suitable source of pressurized air, such as regulated shop air generally available in industrial manufacturing facilities. The plenum 100 may provide continuous or pulsed air. The pulsed air may be provided using a source 36 and a valve 37 such as, for example, those shown in FIG. 2. The use of pressurized air to blow off the diverter plate 26 may be used either alone or in combination with the floor blow off feature described herein below with respect to FIG. 2. The invention thus also provides a method for recovering overspray powder during a spraying operation by providing pressurized air that blows off powder from the sloped floor and/or diverter plate into the floor duct and out to the powder recovery system.

The plenum 100, as well as the diverter plate 26, may be made of any suitable material including metal or composite non-metal materials, with the required strength. In an alternative design, a slot or series of slots may be used for the openings 112 rather than a series of air jets. Still further, if the sloped sides 102, 104 of the diverter plate 26 are hinged, the plenum 100 may be attached lengthwise to only one of the sloped sides 102, 104. Any suitable structure other than a plenum may alternatively be used to provide a flow of pressurized air along the top center of the diverter plate 26 and to direct air across the surface of the diverter plate.

The booth 2 shown in FIG. 2 differs from that of FIG. 1 in that a plenum 34 is provided at the upper edge of each of the side portions 22. The plenum 34 on the left-hand of the booth in the sense of the Figures is shown in greater detail in the sectional view of FIG. 3. The plenum 34 comprises a tube mounted within the wall 4 and formed with spaced outlets 35 along the length thereof. The plenum 34 is connected to a source of pressurised air via a valve shown schematically at 36 and 37, respectively, in FIG. 2. Air from the source 36 is directed out of the air outlets 35 as jets across the side portions 22.

Figure 2A:
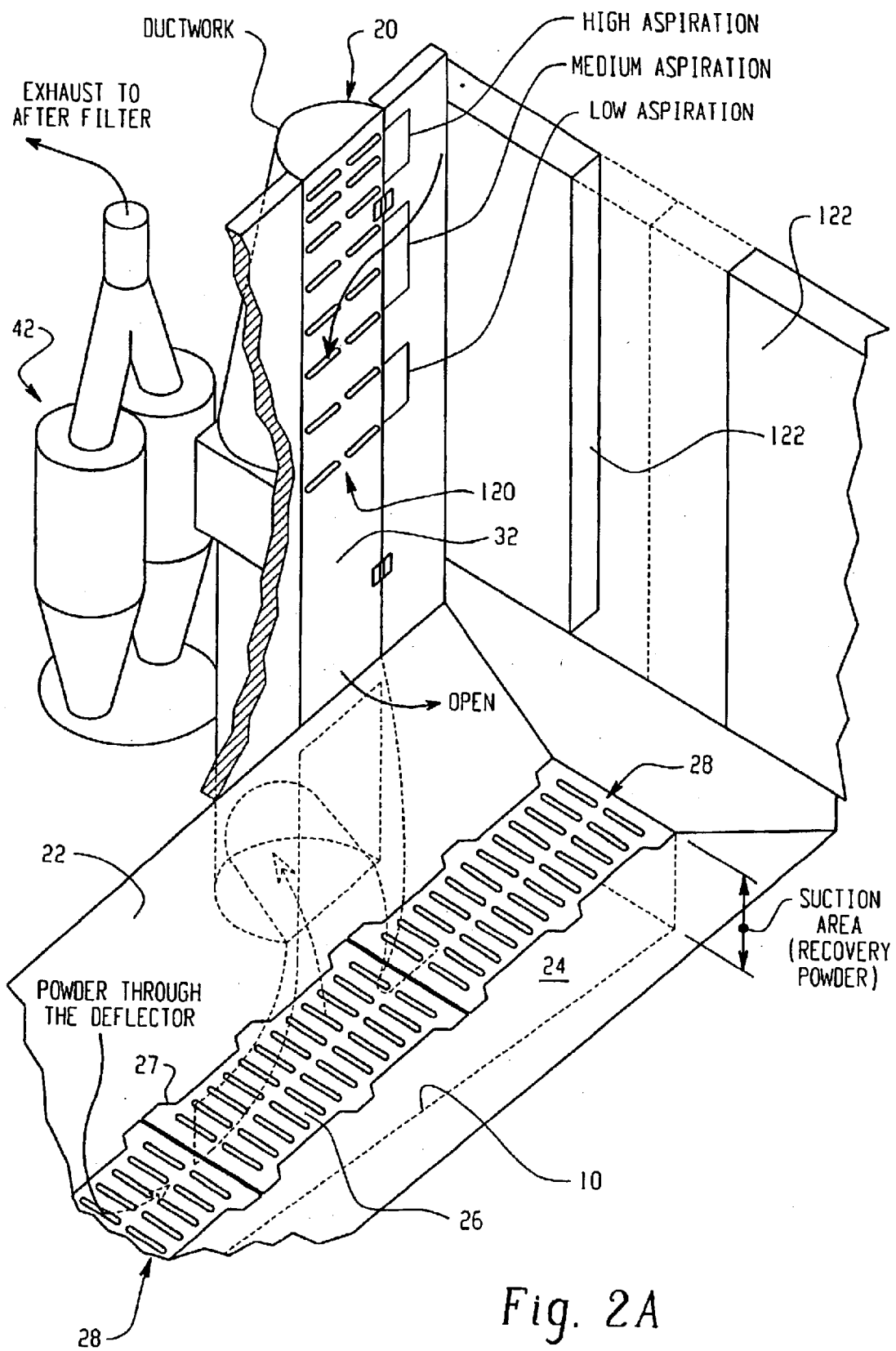
FIG. 2A is a perspective view partly cut away of another embodiment of the invention.
Figure 3A:
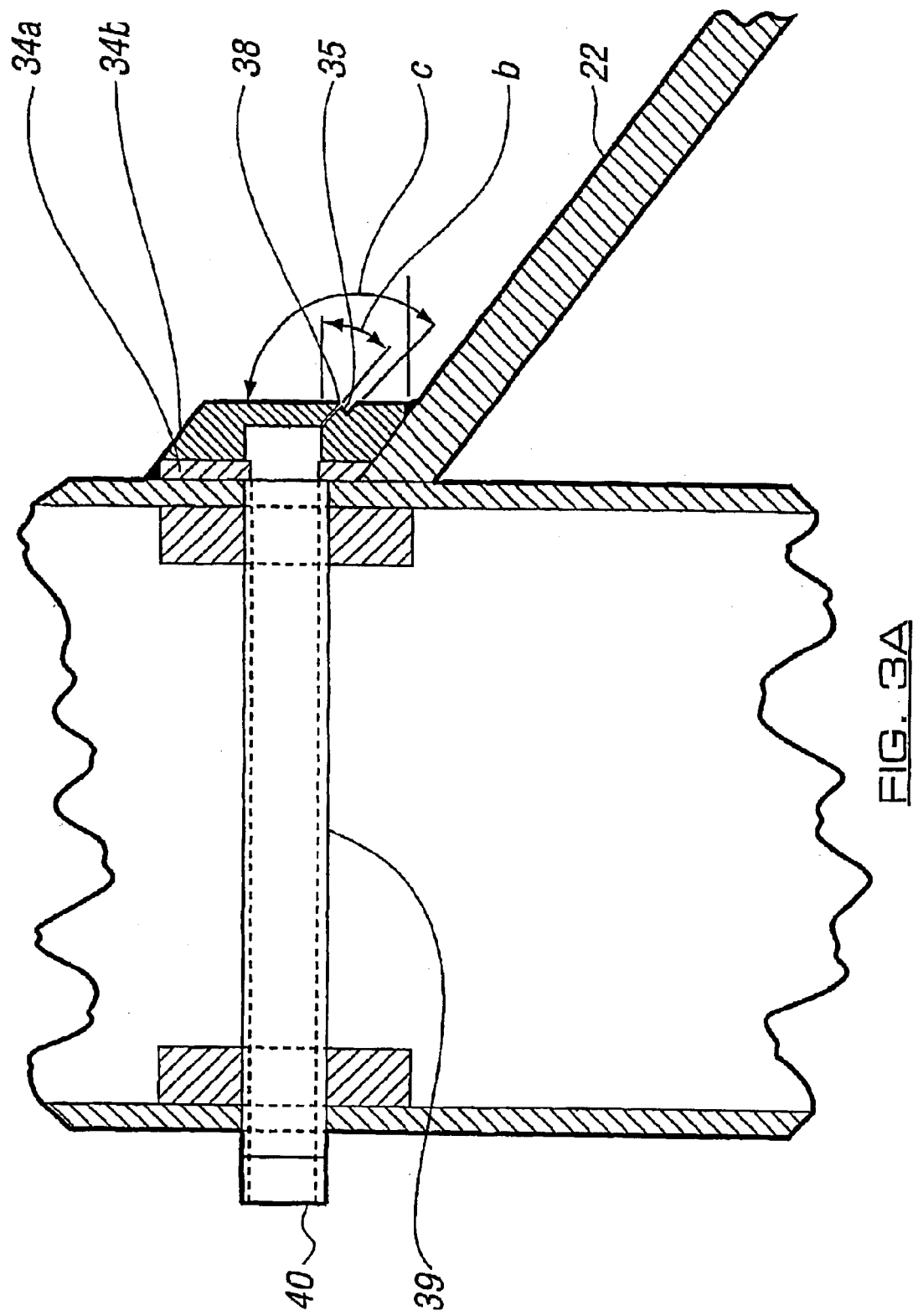
FIG. 3A is a sectional detail of an alternative embodiment of the booth part of FIG. 3.

With reference to FIG. 2A, in an alternative embodiment the optional hinged or otherwise optionally removable doors 32 of the vertical duct 20 are provided with one or more holes 120, suitably spaced along the vertical length of the doors 32 to aspirate air from the spray booth 2 to further optimize air flow patterns within the booth. For example, in the example of FIG. 2A, more holes are provided near the top of the door 32 than at the middle or bottom portions thereof. This produces higher aspiration near the upper portion of the vertical duct 20 in order to produce a suction that draws in powder entrained air in the upper regions of the booth 2 interior before the powder descends to the floor area. Although a cyclone separator 42 is illustrated in FIG. 2A, other powder recovery systems may be used, as noted hereinbefore.

The vertical duct 20 may be used alone or in combination or various sub-combinations with other aspects of the invention described herein. For example, the vertical duct may be used with a booth that has a sloped floor and/or floor duct, or may simply be an additional feature to a conventional spray booth that does not have the floor duct and sloped floor features. The vertically extending duct 20 thus also may be used to enhance powder recovery methods during a spraying operation by aspirating air and overspray powder from upper regions of the spray booth before the powder alights on any of the booth interior surfaces.

Additional optional features illustrated in FIG. 2A include providing sliding doors 122 as part of one or both of the end walls 6. The doors 122 are shown in an open position, with the closed position shown in phantom lines. The sliding doors provide selectable access to the booth 2 interior for conveying parts there through, without the need for a permanent opening in the end wall 6. This provides a more enclosed spray booth to further improve and control air flow patterns within the booth.

Another optional feature illustrated in FIG. 2A is to provide a lengthwise slope to the floor 10 that forms part of the trough 24. The floor 10 may be sloped so as to further contribute to a balanced air flow and suction within the spray booth. The floor is preferably sloped downward towards the overspray extraction intake duct 18 end so as to provide greater suction in the region of the automatic spray guns. A dual sloped floor may be used in those situations where an overspray intake is used at each end of the spray booth 2.

FIG. 3A shows an alternative arrangement for providing pulsed air flow across the side portions 22. The arrangement has a number of features in common with that illustrated in FIG. 3 and where appropriate like reference numerals will be used for like parts.

In the arrangement of FIG. 3A, a plenum 34 again extends the length of the side portion at its upper edge. The plenum is formed in two parts 34*a*, 34*b*, the forwardmost part 34*b* being formed with spaced outlets 35 which extend to a generally v-shaped groove 38 which is milled in the forwardmost part 34*b*.

The plenum is supplied by a series of air feed tubes 39 spaced along the length of the booth. The feed tubes 39 are in turn supplied by a valved pressurised air source as in the arrangement of FIG. 3 but not shown in FIG. 3A, the connections being via threaded inlet fittings 40.

Whichever arrangement is employed, that of FIG. 3 or that of FIG. 3A, the air outlets 35 are preferably arranged to direct the air jets at an angle of 1–3° to the side portions 22. Therefore if the angle (a) of the side portions 22 is 37° with respect to the horizontal floor of the booth, the air outlets 35 will direct air at an angle (b) of 38–40° to the horizontal. This orientation of air outlets 35 will cause the air jets to impinge on side portion 22 at an angle of 1 degree to 3 degrees. In the arrangement of FIG. 3A where the groove 38 is provided, the lower wall of the groove may be at an angle (c) of 135° to the vertical, that is, 45° to the horizontal.

The plenum 34 of the arrangement shown in FIG. 3 may be a PVC extrusion which is bonded to the inner panel 41 of wall 4. Alternatively, as is illustrated by FIG. 3A, the plenum can be attached externally of the wall 4. The plenum 34 can also take other forms from those illustrated in FIGS. 3 and 3A.

In use, the booth 2 is employed to spray powder on to objects passing therethrough either from automatic guns extending through the slots 14 and/or by manual guns directed through the openings 16. Air borne overspray powder is extracted from the interior of the booth 2 on the current of exhaust air produced by the powder recovery system via the overspray extract 18 and duct 20. Overspray powder which falls out of the transport air provided by the powder recovery system will be deposited on the floor 10 of the booth 2 and so on the side portions 22, the bottom of the trough 24 and the plate 26. The flow of exhaust air caused by the air recovery module along the trough 24 will tend to draw deposited overspray powder on the upper surface of the diverter plate 26 down into the trough 24 therebelow either through the holes 28 or the slots 27 between the side portions 22 and the diverter plate 26. It has been found that the elongate shape of the holes 28 maximises the area therearound from which deposited overspray powder is drawn into the holes 28 and thence to the overspray intake 18 on the current of exhaust air. The peaking of the upper surface 29 of the plate 26 assists the passage of deposited overspray powder not drawn through the holes 28 into the slots 27 and so again to the overspray intake 18.

Deposited overspray powder on the side portions 22 will to an extent by gravity naturally trickle down the side portions due to their sloping and into the trough 24 and so into the current of exhaust air produced by the powder recovery system. The booth 2 of FIG. 2 however provides an air assist to this process through the plenums 34. The jets of air produced from the air outlets 35 of the plenums 34 increase the movement of the deposited overspray powder down the side portions 22. With short runs between colour changes, an air pulse may be provided just prior to the colour change. With longer runs, an air pulse is provided periodically to prevent deposited overspray powder build-up and so reduce the inventory of powder within the system, particularly the amount of powder in the booth 2. Whilst the air assist could be provided constantly, it has been found that in fact suffices to provide periodic pulses of air to set in motion the deposited overspray powder on the side portions 22. In one successful experiment, a pulse of five seconds every five minutes served to keep the side portions 22 reasonably clear of deposited overspray powder. Pulsing the air, as opposed to constantly supplying compressed air, reduces system energy costs.

The air assist provided by the plenums 34 not only helps keep the side portions 22 clear but also increases the collection of deposited overspray powder on the upper surface from the diverter plate 26.

The great majority of deposited overspray powder which is collected off the side portions 22 and the diverter plate 26 is re-entrained in the exhaust air flow of the powder recovery system and so extracted as, in effect, air borne overspray powder from the booth 2.

The diverter panel 26 could extend the full length of the booth 2. However it has been found that it suffices for it to extend just past the slots 14 for automatic guns by an offset which, as noted above, can be in the order of 200 mm. This is because the higher number of guns in the automatic gun portion of the booth produces more powder flow, and this greater powder flow is closer to the fan than the manual guns. The effect of the diverter plate is to equalize the suction force of the fan so that the powder has more time to adhere to the part and oversprayed powder is more evenly drawn into the collection system. Since the manual guns are farther from the fan, their spray patterns are not as greatly affected by the fan and the need for the diverter plate is therefore reduced with respect to those guns.

The diverter plate 26 functions to even out air distribution along the booth 2 to give an air balance in the powder booth which leads to higher transfer efficiency while ensuring good powder containment. Thus it serves to reduce the amount of deposited overspray powder and so increase the amount of air borne overspray powder. This balancing effect is achieved in part by the pattern of holes 28. As the diverter plate 26 is an air flow restrictor, the size, number and pattern of the holes determines the air velocity through the overspray intake 18. As an example, the diverter plate 26 may be arranged so that in combination with the input air velocity of the powder recovery system and the cubic feet per meter rating of the booth 2, the air velocity through the overspray intake 18 is 2000 ft/min.

The booth 2 shown in FIGS. 1 and 2 has a single diverter plate 26 which is used in conjunction with the single overspray intake 18. However in a booth with two overspray intakes such as that shown in European Patent Application No. 98940476.9, a diverter plate 26 could be provided at both ends extending towards the middle of the booth 2. The diverter plates 26 would preferably stop short of the "dead" zone in the middle of the booth which it has been found is created by the provision of two overspray intakes, one at each end of the booth. The dead zone is a relatively quiet area of the booth, in that the air flows caused by the collection system are not as strong in that area of the booth as in the remainder of the booth.

During spraying, air is periodically supplied to the plenums 34 to produce air jets down the side portions 22 and so cause movement of deposited overspray powder thereon into the trough 24 and on to the diverter plate 26. The air jets will also assist in keeping the diverter plate 26 clean. In one working embodiment, the plenums 35 had 0.5 mm diameter holes set at a 15 mm spacing and powder collection was achieved by blowing air at 4 bar pressure for five seconds every five minutes. As will be appreciated, the air assist parameters given for any given booth will depend on various parameters such as the type of powder coating material, the configuration on the booth, and in particular, the angle of sloping of the side portions 22. The provision of air assist means that if desired the angle of sloping can be reduced which makes it easier for operators to move around within the booth 2 and facilitates construction of the booth 2.

Figure 7:
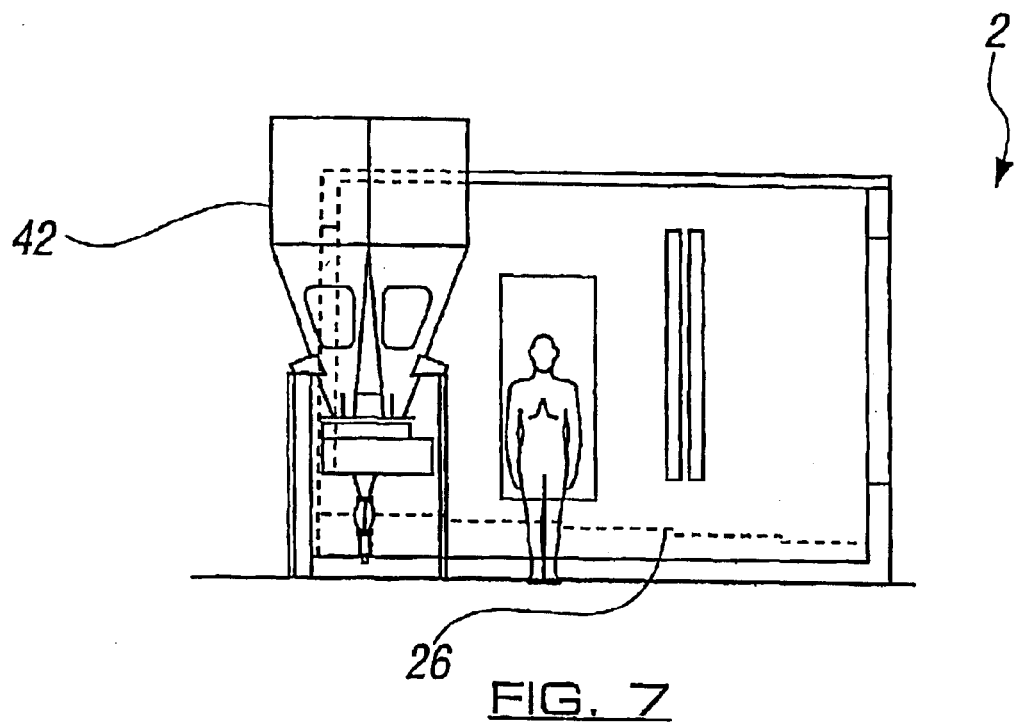
FIG. 7 is a schematic side view of part of a third embodiment of a powder coating system in accordance with the invention.
Figure 8:
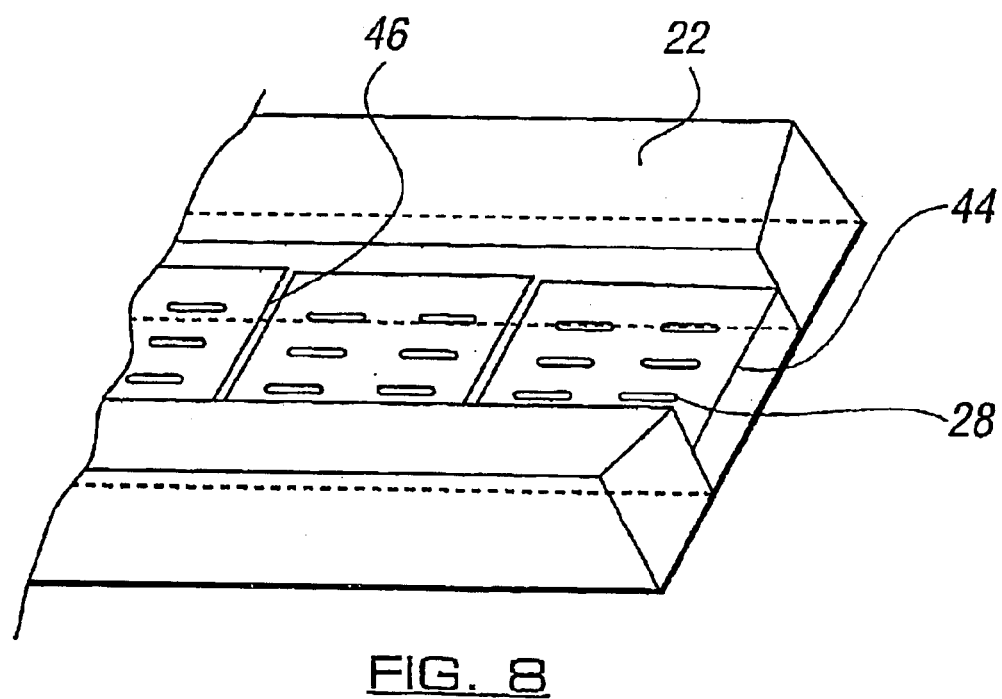
FIG. 8 is a perspective view partly cut away of part of a powder spray booth forming part of the powder coating system of FIG. 7.

FIGS. 7 and 8 illustrates schematically a further embodiment which has many features in common with those of FIGS. 1 and 2 and therefore like reference numerals will be used for like parts. In the embodiment shown in FIGS. 7 and 8, the diverter plate 26 extends the length of the booth which is provided at one end with a powder recovery system having a cyclone separator 42. The plate 26 need not extend the full length of the booth and could instead stop short of the end distant from the powder recovery system like the plate 26 of the powder spray systems illustrated in FIGS. 1 and 2. However, unlike those systems, the plate 26 is formed in a plurality of sections 44 each of which may be considered as a separate diverter plate, the plural sections being arranged as a series of steps descending away from the powder recovery system. The sections 44 may be integral or separate. As illustrated in FIG. 8 they may be arranged such that a slot 46 is provided between each section 44 and the next section down the booth.

The advantage in embodiments illustrated in FIGS. 7 and 8 is that it has been found to give even more balanced airflow throughout the booth because of the narrowing powder suction duct below the diverter plate 26 as the diverter plate sections 44 step down in the direction away from the cyclone separator 42. In addition, the diverter plate sections 44 are kept almost free of powder due to the airflow striking their surfaces in an almost parallel manner and drawing powder through the slots 46 formed between the plate sections 44.

Whilst rectangular booths as shown in FIGS. 1, 2 and 7 are very common, it is also known to use cylindrical or circular booths. With many known circular booths there is a problem which is that, for effective overspray powder extraction, it has been found necessary to provide a conical floor. In order to accommodate the conical floor the booth has either to be very tall or, in order that articles may be received at the same level as at other stations of a conveyor line, a pit has to be provided for the conical floor.

It has now been found that it is possible to obtain good overspray powder recovery with a circular booth having a flat base by incorporating therein a diverter plate and using this in conjunction with a powder recovery system which exhausts air from the booth.

Figure 9:
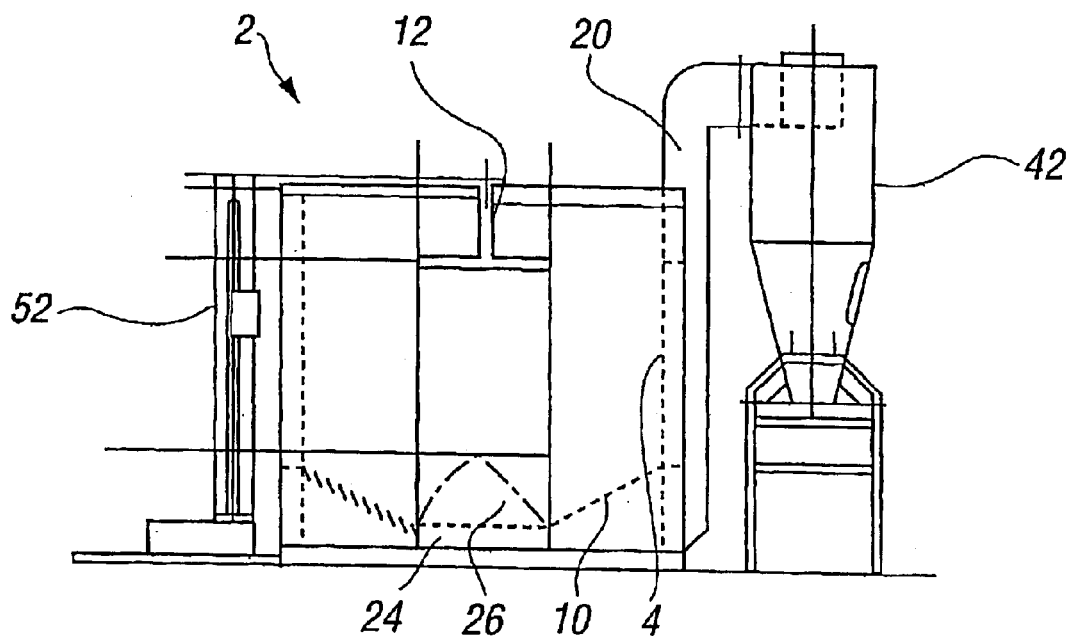
FIG. 9 is a schematic end view of a fourth embodiment of a powder coating system in accordance with the invention.
Figure 10:
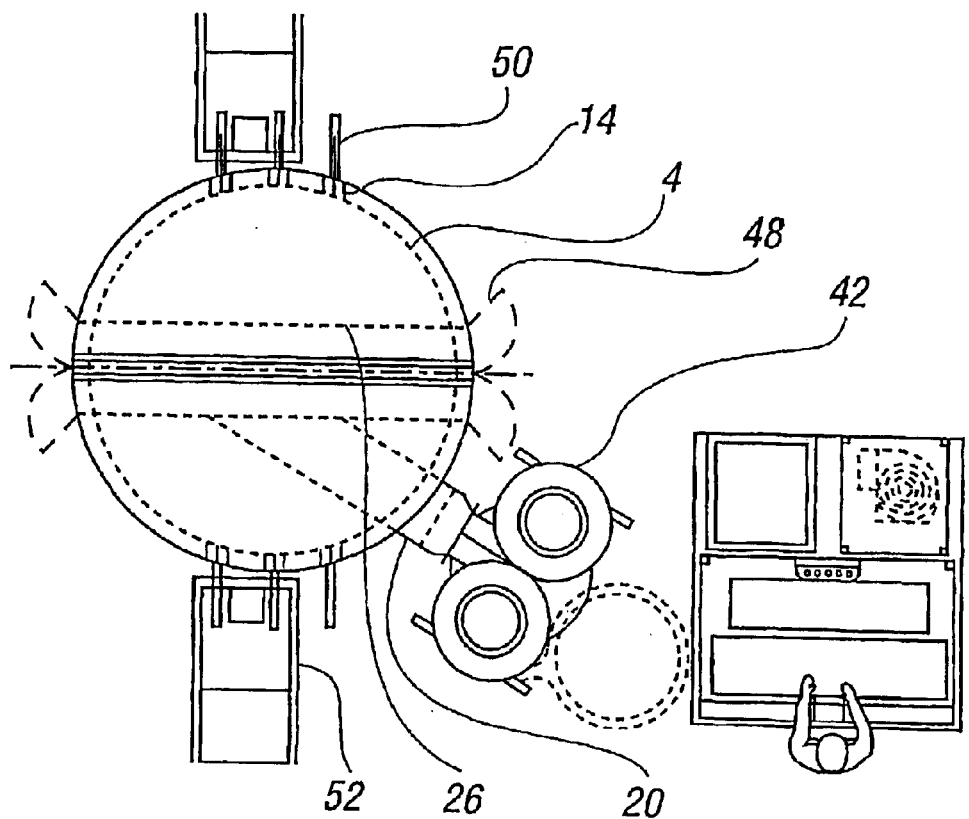
FIG. 10 is a plan view of the powder coating system of FIG. 9.

FIGS. 9 and 10 illustrate a circular booth 2 with a centrally located overspray intake leading via a duct 20 to a cyclone separator 42. A diverter plate 26 extends diametrically across the booth 2 below the path taken by articles to be sprayed which enter and leave via openings which may be closed by doors 48. On either side of the plate 26, the booth floor 10 slopes upwards towards the booth wall 4 in each side of which three slots 14 are provided for automatic guns shown schematically at 50 together with the gun mounts shown schematically at 52. As in the embodiment of FIGS. 1 and 2, the diverter plate 26 may be hinged along one edge so that it can be raised up to the side for cleaning of the trough 24, as is illustrated in dot-dash lines in FIG. 9.

The circular booth 2 has a low height and so no pit or platform is required. An operator can easily walk into the booth 2 so that it can be cleaned of any residual powder when changing colours by wiping. There is no safety issue as in current commercial booths since the operator cannot fall into a deep conical floor as there is none.

Figure 11:
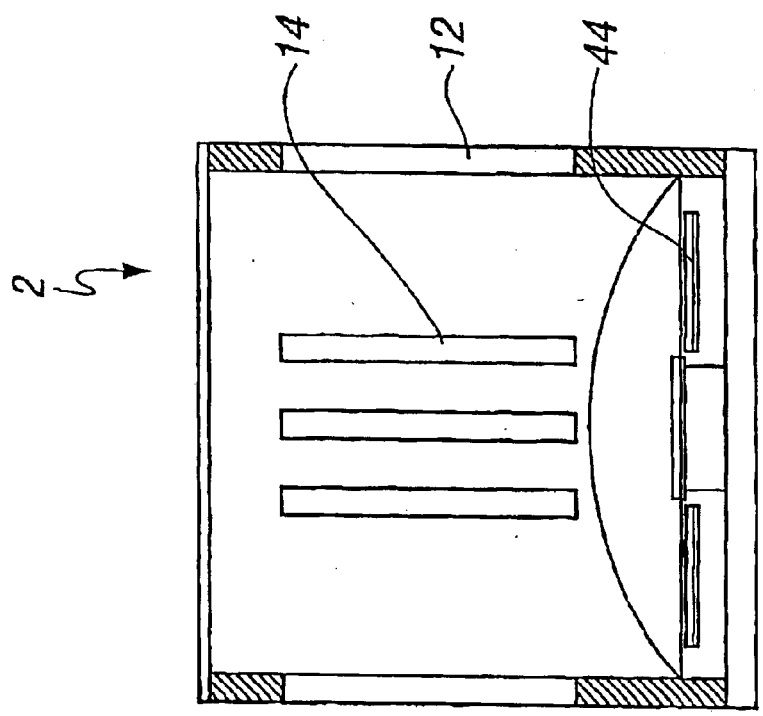
FIG. 11 is a schematic plan view of a fifth embodiment of a power coating system in accordance with the invention.
Figure 12:
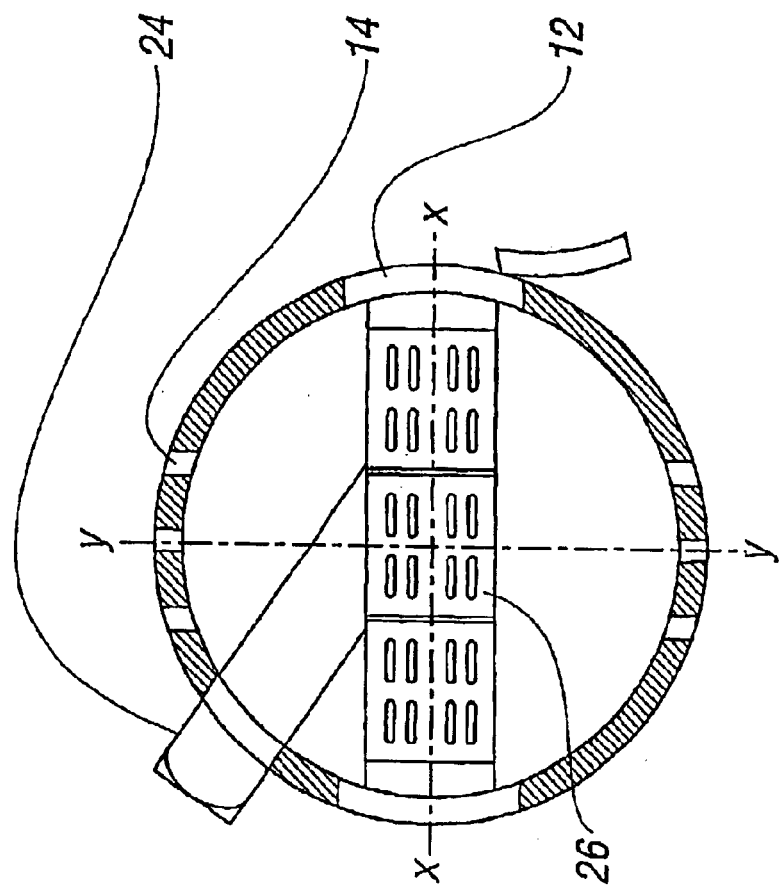
FIG. 12 is a section along X—X of the powder coating system of FIG. 11.

FIGS. 11 to 13 illustrate a circular booth 2 where a central, diametrically extending, diverter plate 26 is arranged in stepped fashion similarly to the embodiment illustrated in FIGS. 7 and 8. The diverter plate 26 is formed in three sections 44, the two side sections being lower than the central section which is above the extraction point. The result again is balanced air flow through the booth 2 and even suction across the booth base because the duct 24 is narrowest in the regions most remote from the extraction point.

As can be seen in FIG. 11, the diverter plate sections 44 may be slightly peaked which, as noted above with respect of FIG. 6, enhances strength and stiffness. FIG. 11 also shows that the diverter plate sections 44 may be hinged to one of the side portions 22 to allow them to be moved up to the position shown in dotted outline and thereby give access to the trough 24 which extends through the booth.

Figure 15:
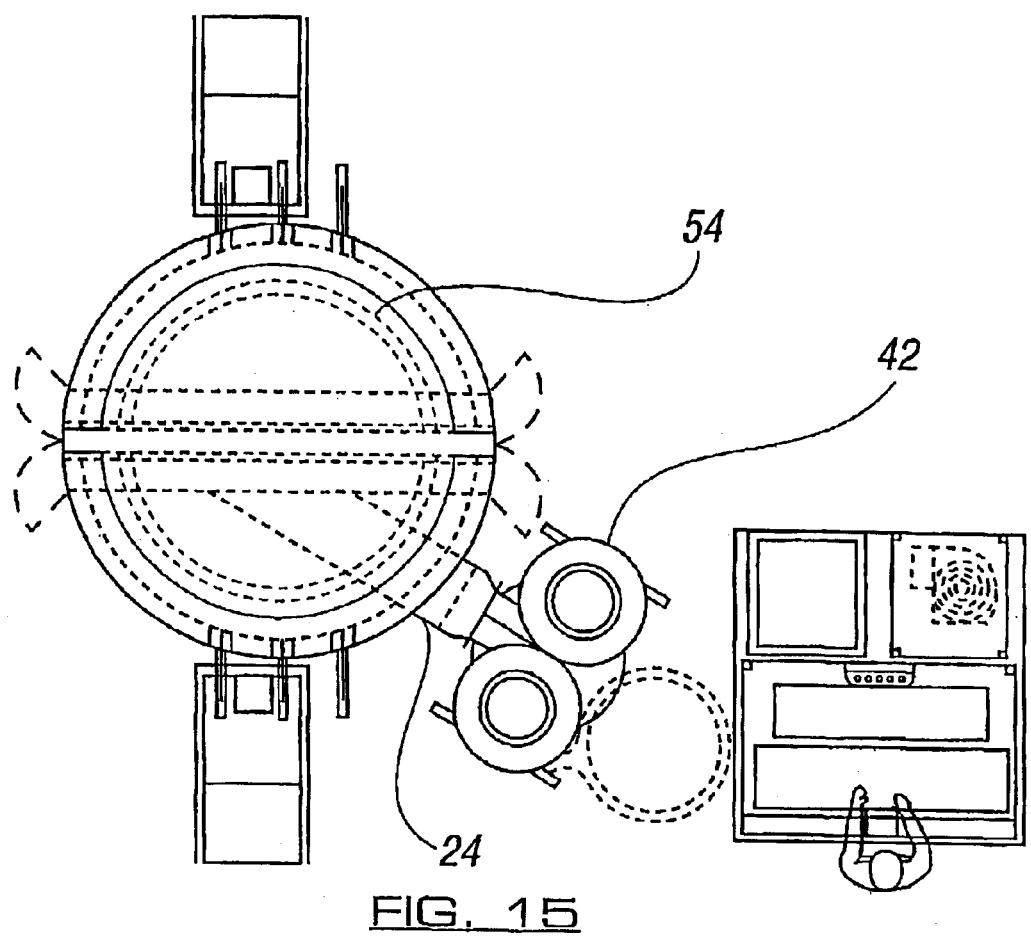
FIG. 15 is a schematic plan view showing the cleaning system of FIG. 14.

The circular booths 2 of FIGS. 9 to 13 can be manually cleaned such as by blowing them down with an air wand or wiping. Alternatively, automatic cleaning devices could be used. FIGS. 14 and 15 illustrate an automatic cleaning arrangement with a double "D" profile cleaning air ring 54 shown in both an upper position and a lower position. The ring 54 directs air towards the walls 4 of the booth 2 as it is lowered and raised therein. As cleaning ring 54 is lowered from the ceiling, it blows any powder which has collected on the walls down the walls of the booth and into the collection system housed in the lower portion of the booth. The ring 54 may be retracted into the booth roof for normal cleaning.

Figure 16:
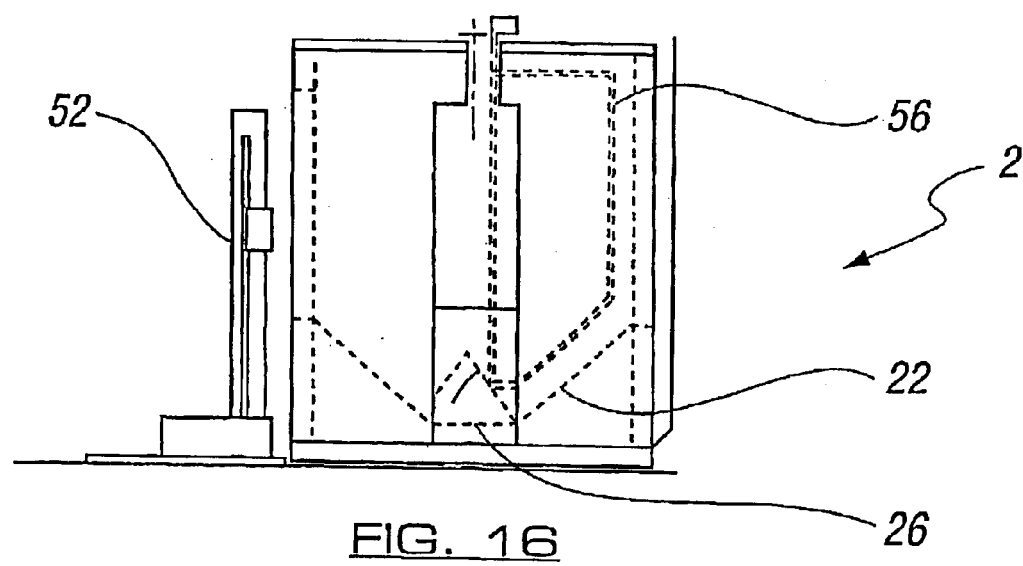
FIG. 16 is a schematic end view showing an alternative cleaning system for use in the powder coating systems of FIGS. 9 to 13.

FIG. 16 illustrates an alternative system for automatic cleaning which comprises an air cleaning frame 56 which rotates inside the booth 2 whilst blowing air onto the walls 4 and floor 10 to remove deposited overspray powder which is collected through the trough in the bottom of the booth. The cleaning frame 56 could be partial as illustrated or could be double-sided or mirrored to speed cleaning. The frame 56 would preferably be parked outside the booth 2 when the booth is in normal operation. To clean the booth 2, the frame 56 would be attached to the conveyor and moved into the booth 2.

Figure 17:
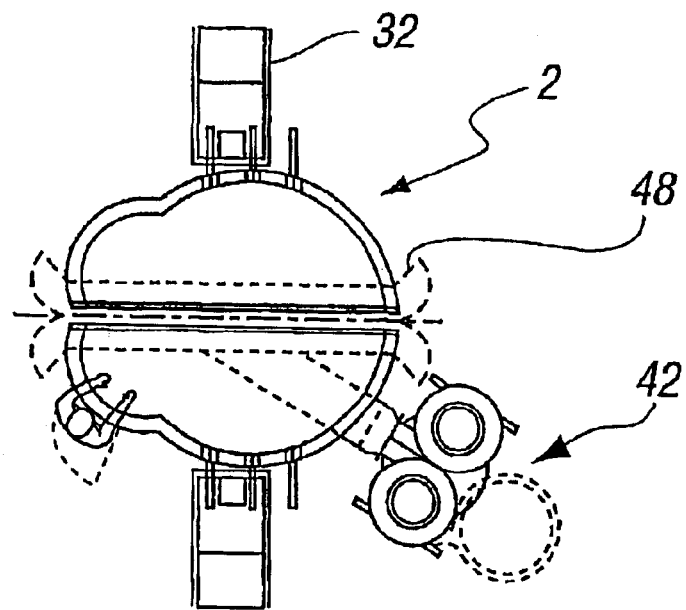
FIGS. 17 and 18 are plan views showing possible modifications which can be made to the powder coating booth of the powder coating systems of FIGS. 9 to 13.
Figure 18:
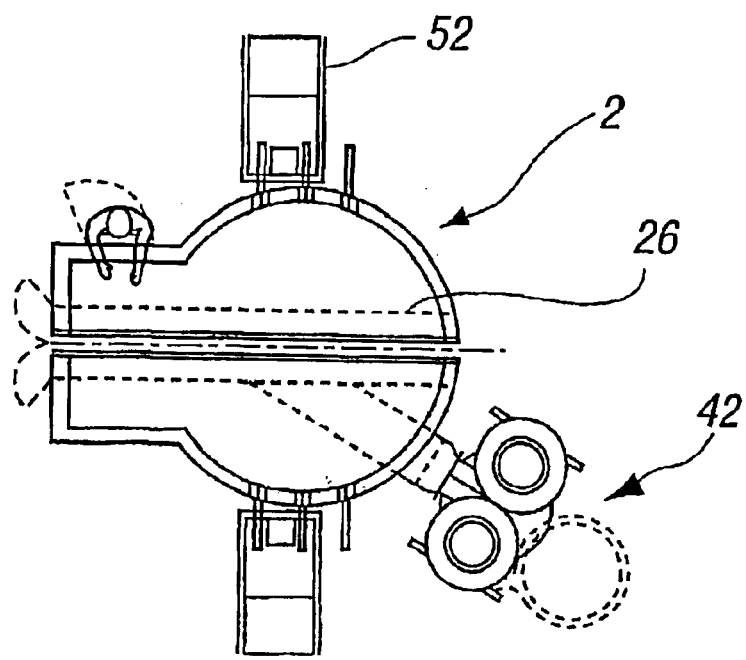

In order to allow manual powder coating guns to be used in combination with automatic powder spray guns, the circular configuration shown in FIGS. 9 to 16 may be modified to provide at least one station for an operator. FIGS. 17 and 18 illustrate modified booth shapes which accommodate manual spray guns. The illustrated configurations allow manual spray guns to be used from both sides of the booth 2 but manual guns used from one side alone may suffice in which case the other side would preferably be smoothly curved to prevent accumulation of powder therein. It will be appreciated that other shapes are possible. For example, rather than being indented as shown in FIG. 18 the booth walls may be straight between the sides of the article entrance slot 12 and the automatic gun slots 14.

All of the circular booths embodiments may be provided with air assisted overspray collection by fitting plenums to direct air jets down the floor side portions 22 and so cause movement of deposited overspray thereon into the trough 24 and onto the diverter plate 26. As with the rectangular booth embodiments, the provision of air assist will mean that the sloping of the side portions 22 may be reduced which will make it easier for operators to move around within the booth 2 and facilitate its construction.

The air assist need not be used in conjunction with a diverter plate 26. FIGS. 19 to 21 illustrate arrangements in which air assist is employed simply in combination with a sloped floor portion. In the arrangement of FIG. 19 nearly the whole of the floor 10 is sloped and the air assist is provided across the complete upper edge of the sloped floor 10. This Figure also serves to show schematically the withdrawal of air borne overspray powder via duct 20 and into a cyclone separator 42 of a powder recovery system.

In a circular booth, the whole of the booth floor 10 may be sloped. This is illustrated in FIG. 20 which shows a circular booth 2 having a sloped floor 10. As also illustrated the floor may be perforated and formed in three sections with the outer sections being hinged or otherwise raisable to facilitate cleaning. In the FIG. 20 embodiment, the center section of the diverter plate would remain stationery and the outer two sections could be hinged upwardly to allow the operator to enter from either side of the booth.

FIG. 21 shows a further alternative in which the floor 10 has a triangular cross-section and the air assist is provided at the apex thereof. As shown by the arrows, the air assist moves deposited overspray powder down each side of the floor 10 to prevent build-up on the floor 10 and to collect the deposited overspray at the sides of the booth 2. The booth 2 may have side inlet ducts for receiving the collected overspray powder and directing it to the powder recovery system.

In still further alternatives, the air assist is provided across other non-sloped internal surfaces of the booth 2, for example, one or more of the walls or the ceiling. Air assist can also be provided to an advantage with a non-sloped floor. A particular embodiment which may have great utility is to provide air assist centrally of the booth disclosed in European Patent Application No. 98940476.9 such that the jets of air are directed towards the ends of the booth and thus to each of the overspray intakes provided at those ends. The air assist will facilitate collection of deposited overspray powder on the floor and movement thereof towards the overspray intakes for recovery by the powder recovery system.

In all these alternatives, the air assist may be continuous or pulsed. The latter has the advantage of economy due to reduced energy requirements for the air source and therefore cost savings.

With a long run between the colour powder changes, it is desirable that an air pulse be provided periodically, whilst with short runs, it can suffice to provide a pulse just prior to the colour change.

Reverting to FIGS. 1 and 2, the cleaning operation which is performed when the colour of the powder is to be changed will now be described. It will be appreciated that the description applies equally to the other embodiments provided with a diverter plate 26 and a powder recovery system which provides for air exhaust. The powder spray devices are shut off and doors closed across the access openings 12 in the end wall 6. The diverter panel 26 is pivoted up against the adjacent end wall 6 as too are the doors 32 to the vertical duct 20. An operator preferably using an air hose, begins at the opposite end of the booth 2 from the vertical duct 20 and moves along the booth blowing the deposited overspray powder which remains therein from all wall and floor surfaces including the sloped floor surfaces and the surfaces of the diverter panel 26, the floor duct, the vertical duct 20 and the overspray intake 18. The operator may open each diverter panel individually as he walks along the length of the booth so that the floor duct will still transport the blown off powder to the overspray intake, the vertical duct and the powder recovery system. These last two operations are simplified because of the hinged mounting of the diverter panel 26 and the doors 32 of the vertical duct 20. As the powder is blown off of the surfaces of the booth, it is drawn into the extraction duct 20 by the fan.

The amount of deposited overspray powder which has to be removed in this operation is much less than with known booths because a significant proportion of the deposited overspray powder will have already been removed due to the action of the diverter plate 26, sloped side portions 22 and the air plenums 34. Consequently the amount of recycling work to be done during the cleaning process is reduced which reduces labour costs. Also, in some prior systems, powder has to be collected in a dust pan or waste container and thrown away because recycling has not been completed by the time the cleaning process is over. This waste of powder coating material will not occur in the present system due to the reduced time and effort required to clean the booth.

In tests with this booth, it has been found to be possible to reduce booth cleaning time to below fifteen minutes.

These improvements in colour change capability are achieved whilst at the same time improving the actual performance of the booth since the diverter plate 26 acts to even out, or balance across the length of the booth the air flows which draw oversprayed powder into the system. This has the effect of improving the transfer efficiency of the guns because the powder particles have a better opportunity to attach to the part being coated. In addition, oversprayed powder is more effectively contained within the booth by mans of this design.

What is claimed is:

1. A powder spray booth comprising:
    a booth floor that is generally impervious to air and having at least one downwardly sloped portion;
    a powder overspray intake for drawing powder entrained air from an interior of the spray booth;
    said floor including a trough in communication with said powder overspray intake so that powder entrained air is drawn by suction into and through to said overspray intake; and a source of pressurized air that blows oversprayed powder from said at least one said downwardly sloped floor portion into said trough during a spraying operation.

2. The booth of claim 1 further comprising a diverter plate that overlays at least a portion of said trough.

3. The booth of claim 1 wherein said source of pressurized air comprises an air passageway that extends longitudinally along at least a portion of said at least one downwardly sloped floor portion.

4. The booth of claim 1 wherein said pressurized air flows in a direction substantially towards said trough.

5. The booth of claim 1 wherein said source of pressurized air is disposed inside the booth and operates during a normal spraying operation.

6. The booth of claim 5 wherein said source comprises an air plenum disposed near said floor sloped portion.

7. A powder coating system comprising a powder spray booth having walls and a floor, a trough disposed below said floor, being generally impervious to air: one or more powder spray devices positioned with respect to the walls to spray articles passed through the booth via openings in the walls, and a powder recovery system having an overspray intake communicating with the interior of the booth, the powder recovery system including suction means for drawing overspray powder from the booth interior trough said trough and into the overspray intake, wherein at least a portion of the booth floor is sloped and wherein cleaning air supply means is provided for directing air down the sloped portion during a spraying operation.

8. The system of claim 7 wherein the cleaning air supply means comprises a source of air and at least one plenum with at least one air outlet, the air source providing air to the air outlet and the plenum being arranged to direct the air down the sloped portion of the booth floor.

9. The system as claimed in claim 8 wherein another portion of the floor and/or one or more of the walls and/or a ceiling of the spray booth is provided in a cleaning plenum.

10. The system as in claim 9 where the another portion is a portion of the floor.

11. The system as in claim 10 wherein the portion of the floor is the center of the floor.

12. The system as claimed in claim 7 wherein the air source provides periodic pulses of air to the air outlet.

13. The system as claimed in claim 7 wherein the booth floor has two side portions and a downwardly offset region therebetween which define a a trough between the side portions.

14. The system of claim 7 further comprising a diverter plate held within the booth between the floor side portions such as a close at least part of the trough.

15. The system of claim 14 wherein the diverter plate includes at least one aperture for the passage of overspray powder deposited thereon to the trough.

16. The system of claim 14 wherein the diverter plate is mounted adjacent to at least one of the bottom edges of the side portions such as to define a slot between it and the at least one bottom edge of the side portion for passage of overspray powder to the trough.

17. The system as claimed in claim 14 wherein the diverter plate is mounted to be movable from the position between the side portion to a second position.

18. The system as claimed in claim 14 wherein the diverter plate has a peaked upper surface.

19. The system as claimed in claim 14 wherein the cleaning air supply means directs air down the side portions at least along the length of the diverter plate.

20. The system as claimed in claim 14 wherein the booth is generally rectangular in shape and an overspray intake is provided at or near one or both ends of the booth and wherein the diverter plate extends along part of the length of the booth.

21. The system as claimed in claim 7 wherein an overspray intake is provided at each end of the trough.

22. The system of claim 7 wherein said trough it disposed generally in a central portion of said floor.

23. The system of claim 7 wherein said cleaning air supply means is disposed inside the booth and operates during a normal spraying operation.

24. The system of claim 23 wherein said cleaning air supply means comprises an air plenum disposed near said floor sloped portion.

25. The system of claim 7 wherein said cleaning air supply means is disposed in a central portion of said floor.

* * * * *

UNITED STATES PATENT AND TRADEMARK OFFICE
CERTIFICATE OF CORRECTION

PATENT NO. : 6,821,346 B2 Page 1 of 1
DATED : November 23, 2004
INVENTOR(S) : Ainsworth et al.

It is certified that error appears in the above-identified patent and that said Letters Patent is hereby corrected as shown below:

Title page,
Item [63], Related U.S. Application Data, should read -- Continuation of application No. 10/214,277, filed on Aug. 7, 2002, which is a continuation-in-part of application No. 10/168,329, having a 371(c) filing date of Nov. 25, 2002, which is a 371 of application No. PCT/GB01/01116, filed Mar. 14, 2001 which claims the benefit of EP application No. 00302737.2, filed on Mar. 31, 2000. --.

Signed and Sealed this

Fourteenth Day of February, 2006

JON W. DUDAS
*Director of the United States Patent and Trademark Office*